United States Patent
Maruyama et al.

(10) Patent No.: US 10,035,238 B2
(45) Date of Patent: *Jul. 31, 2018

(54) POLISHING METHOD AND POLISHING APPARATUS

(71) Applicant: EBARA CORPORATION, Tokyo (JP)

(72) Inventors: Toru Maruyama, Tokyo (JP); Hisanori Matsuo, Tokyo (JP); Yasuyuki Motoshima, Tokyo (JP)

(73) Assignee: EBARA CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/696,926

(22) Filed: Sep. 6, 2017

(65) Prior Publication Data

US 2017/0361420 A1    Dec. 21, 2017

Related U.S. Application Data

(62) Division of application No. 14/465,792, filed on Aug. 21, 2014, now Pat. No. 9,782,870.

(30) Foreign Application Priority Data

Aug. 27, 2013   (JP) .................................. 2013-175471

(51) Int. Cl.
*B24B 37/015*   (2012.01)
*B24B 49/14*   (2006.01)
(Continued)

(52) U.S. Cl.
CPC ............ *B24B 37/015* (2013.01); *B24B 49/14* (2013.01); *B24B 55/02* (2013.01); *G01J 5/025* (2013.01); *G01J 2005/0085* (2013.01)

(58) Field of Classification Search
CPC ........ B24B 37/015; B24B 49/14; B24B 55/02; G01J 2005/0085
(Continued)

(56) References Cited

U.S. PATENT DOCUMENTS 4,313,284 A * 2/1982 Walsh .................. B24B 37/015
                                                    451/288
4,450,652 A * 5/1984 Walsh .................... B24B 49/14
                                                    451/288
(Continued)

FOREIGN PATENT DOCUMENTS

CN    101254586 A    9/2008
CN    102179757 A    9/2011
(Continued)

*Primary Examiner* — Eileen Morgan
(74) *Attorney, Agent, or Firm* — Baker & Hostetler LLP

(57) ABSTRACT

A polishing method and a polishing apparatus which can increase a polishing rate and can control a polishing profile of a substrate being polished by adjusting a surface temperature of a polishing pad are disclosed. The polishing method for polishing a substrate by pressing the substrate against a polishing pad on a polishing table includes a pad temperature adjustment step of adjusting a surface temperature of the polishing pad, and a polishing step of polishing the substrate by pressing the substrate against the polishing pad having the adjusted surface temperature. In the pad temperature adjustment step, the surface temperature of a part of an area of the polishing pad, the area being to be brought in contact with the substrate, is adjusted during the polishing step so that the rate of temperature change of a temperature profile in a radial direction of the surface of the polishing pad becomes constant in the radial direction of the polishing pad.

5 Claims, 21 Drawing Sheets

(51) Int. Cl.
*B24B 55/02* (2006.01)
*G01J 5/02* (2006.01)
*G01J 5/00* (2006.01)

(58) Field of Classification Search
USPC .................................................. 451/7, 53
See application file for complete search history.

(56) References Cited

U.S. PATENT DOCUMENTS

| | | | | |
|---|---|---|---|---|
| 5,127,196 | A * | 7/1992 | Morimoto | B24B 37/107 257/E21.244 |
| 5,733,177 | A * | 3/1998 | Tsuchiya | B24B 37/042 451/285 |
| 5,775,980 | A * | 7/1998 | Sasaki | B24B 37/015 257/E21.304 |
| 6,012,967 | A | 1/2000 | Satake et al. | |
| 6,905,397 | B2 * | 6/2005 | Sharan | B24B 37/24 451/287 |
| 7,201,634 | B1 * | 4/2007 | Naujok | B24B 37/015 451/288 |
| 7,513,819 | B2 * | 4/2009 | Kiuchi | B24B 37/015 451/41 |
| 7,837,534 | B2 * | 11/2010 | Aiyoshizawa | B24B 55/02 451/287 |
| 8,172,641 | B2 * | 5/2012 | Ho | B24B 55/02 451/41 |
| 8,845,391 | B2 * | 9/2014 | Sone | B24B 37/015 451/41 |
| 2002/0009953 | A1 * | 1/2002 | Swanson | B24B 37/015 451/53 |
| 2003/0104769 | A1 * | 6/2003 | Brunelli | B24B 49/14 451/53 |
| 2003/0114077 | A1 * | 6/2003 | Yang | B24B 37/32 451/7 |
| 2003/0119427 | A1 * | 6/2003 | Misra | B24B 49/14 451/41 |
| 2003/0186623 | A1 * | 10/2003 | Pham | B24B 21/10 451/7 |
| 2004/0087248 | A1 * | 5/2004 | Hirokawa | B24B 37/015 451/7 |
| 2007/0054599 | A1 * | 3/2007 | Taylor | B24B 37/26 451/6 |
| 2007/0135020 | A1 * | 6/2007 | Nabeya | B24B 37/015 451/7 |
| 2008/0311823 | A1 * | 12/2008 | Aiyoshizawa | B24B 37/015 451/7 |
| 2009/0061745 | A1 * | 3/2009 | Heinrich | B24B 37/24 451/289 |
| 2010/0035515 | A1 * | 2/2010 | Marks | B24B 37/015 451/5 |
| 2010/0203806 | A1 * | 8/2010 | Kitakura | B24B 37/015 451/7 |
| 2011/0081832 | A1 * | 4/2011 | Nakamura | B24B 37/10 451/28 |
| 2011/0159782 | A1 * | 6/2011 | Sone | B24B 37/015 451/7 |
| 2012/0034846 | A1 * | 2/2012 | Minamihaba | B24B 37/015 451/7 |
| 2012/0220196 | A1 * | 8/2012 | Maruyama | B24B 37/015 451/7 |

FOREIGN PATENT DOCUMENTS

| | | |
|---|---|---|
| CN | 102814738 A | 12/2012 |
| JP | S61-013631 A | 1/1986 |
| JP | H06-099350 A | 4/1994 |
| JP | 09-123057 A | 5/1997 |
| JP | 10-156708 A | 6/1998 |
| JP | H11-216664 A | 8/1999 |
| JP | 2007-181910 | 7/2007 |
| JP | 2011-136406 A | 7/2011 |
| JP | 2012-176449 A | 9/2012 |

* cited by examiner

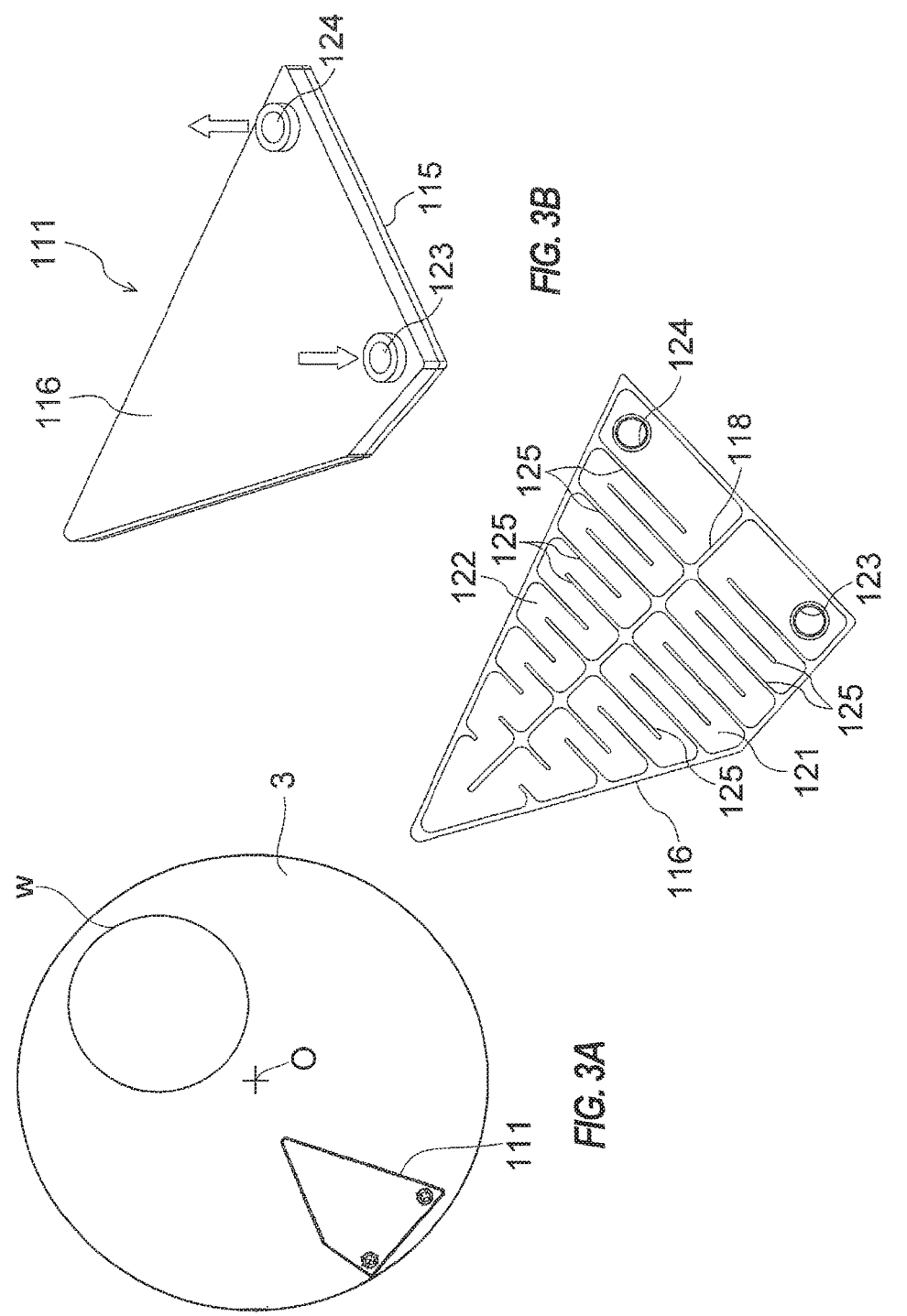

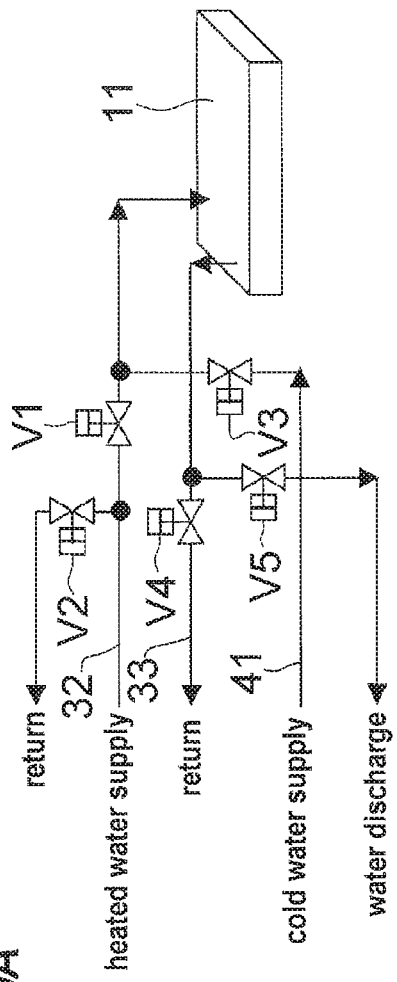

| before switching | after switching | valve No. | | state of valve | delay |
|---|---|---|---|---|---|
| heated water supply | cold water supply | V1 | heated water supply | Open | |
| | | | | Close | |
| | | V2 | heated water circulation | Open | |
| | | | | Close | |
| | | V3 | cold water supply | Open | |
| | | | | Close | |
| | | V4 | heated water return | Open | |
| | | | | Close | |
| | | V5 | water discharge | Open | |
| | | | | Close | |

| before switching | after switching | valve No. | | state of valve | delay |
|---|---|---|---|---|---|
| cold water supply | heated water supply | V1 | heated water supply | Open | |
| | | | | Close | |
| | | V2 | heated water circulation | Open | |
| | | | | Close | |
| | | V3 | cold water supply | Open | |
| | | | | Close | |
| | | V4 | heated water return | Open | |
| | | | | Close | |
| | | V5 | water discharge | Open | |
| | | | | Close | |

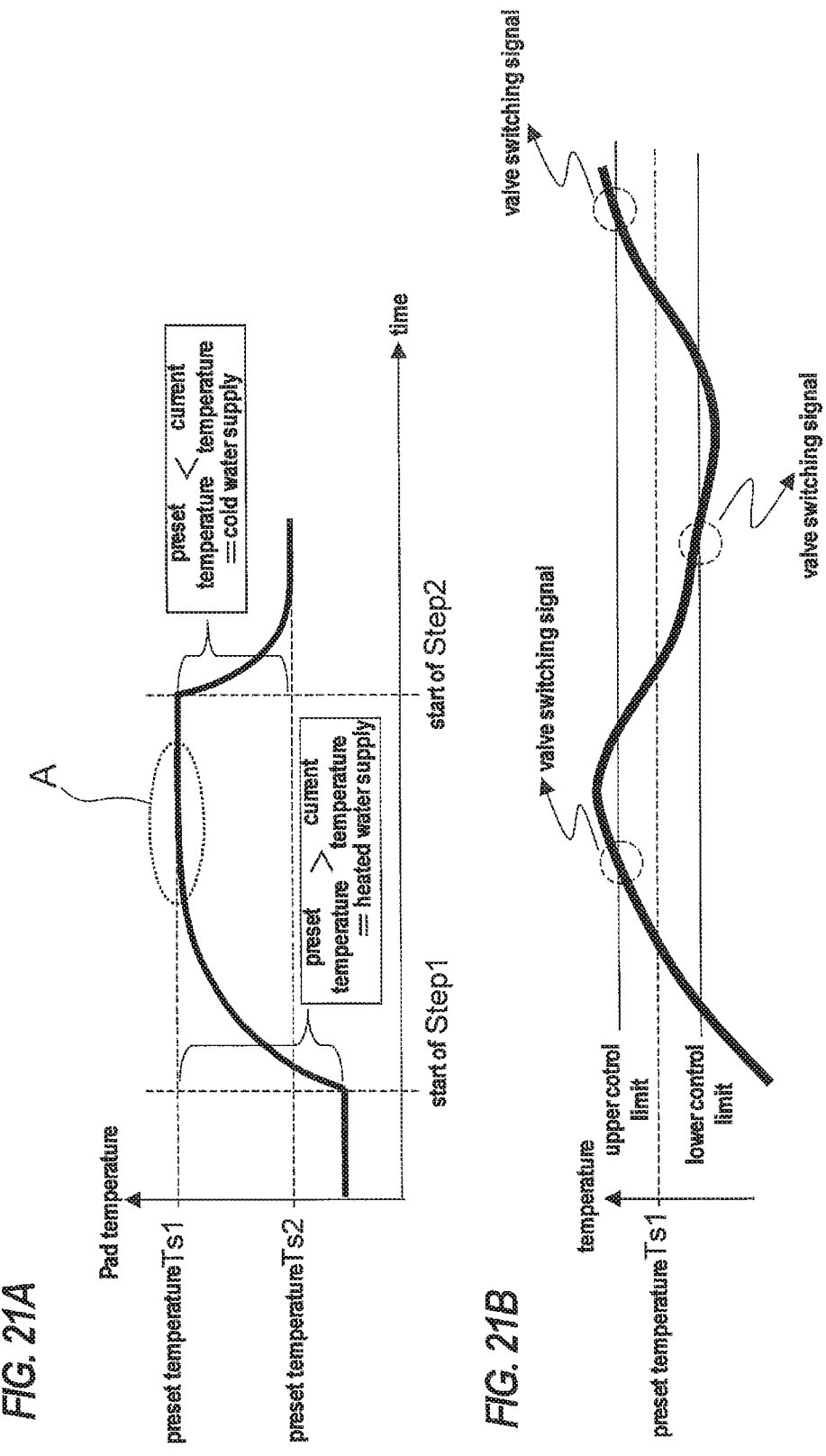

POLISHING METHOD AND POLISHING APPARATUS

CROSS REFERENCE TO RELATED APPLICATION

This application is a divisional of U.S. application Ser. No. 14/465,792 filed on Aug. 21, 2014, which claims the priority and the benefit of Japanese Patent Application No. 2013-175471 filed in Japan on Aug. 27, 2013, the entire contents of which are incorporated herein by this reference.

BACKGROUND

In recent years, high integration and high density in semiconductor device demands smaller and smaller wiring patterns or interconnections and also more and more interconnection layers. Multilayer interconnections in smaller circuits result in greater steps which reflect surface irregularities on lower interconnection layers. An increase in the number of interconnection layers makes film coating performance (step coverage) poor over stepped configurations of thin films. Therefore, better multilayer interconnections need to have the improved step coverage and proper surface planarization. Further, since the depth of focus of a photolithographic optical system is smaller with miniaturization of a photolithographic process, a surface of the semiconductor device needs to be planarized such that irregular steps on the surface of the semiconductor device will fall within the depth of focus.

Thus, in a manufacturing process of a semiconductor device, it increasingly becomes important to planarize a surface of the semiconductor device. One of the most important planarizing technologies is chemical mechanical polishing (CMP). In the chemical mechanical polishing, while a polishing liquid (slurry) containing abrasive particles such as silica ($SiO_2$) or ceria ($CeO_2$) therein is supplied onto a polishing pad, a substrate such as a semiconductor wafer is brought into sliding contact with the polishing pad and polished using the polishing apparatus.

CMP (Chemical Mechanical Polishing) apparatus is used in a process of polishing a surface of a substrate in a semiconductor device fabrication. The CMP apparatus is designed to hold and rotate the substrate by a top ring and press the substrate against a polishing pad on a rotating polishing table to polish the surface of the substrate. During polishing, a polishing liquid (slurry) is supplied onto the polishing pad, so that the surface of the substrate is planarized by a chemical action of the polishing liquid and a mechanical action of the abrasive particles contained in the polishing liquid.

A polishing rate of the substrate depends not only on a polishing load on the substrate against the polishing pad, but also on a surface temperature of the polishing pad. This is because the chemical action of the polishing liquid on the substrate depends on the temperature. Thus, it is important for the semiconductor device fabrication to maintain an optimum surface temperature of the polishing pad during polishing of the substrate in order to increase the polishing rate and keep the polishing rate constant.

Therefore, the present applicant has proposed in Japanese Laid-Open Patent Publication No. 2012-176449 a polishing apparatus which has a pad temperature adjustment mechanism for adjusting a surface temperature of a polishing pad by supplying a temperature-adjusted liquid to a pad contact member that is brought into contact with the surface of the polishing pad.

Because of special importance placed on an increase in the polishing rate, the pad contact member proposed in Japanese Laid-Open Patent Publication No. 2012-176449 is designed to have the largest possible contact area under layout restrictions in order to quickly raise the surface temperature of the polishing pad to a target temperature. Specifically, the pad contact member extends, in the radial direction of the polishing pad, from a peripheral position on the polishing pad to a position near the center of the polishing pad. In view of the expected radial temperature gradient of the surface of the polishing pad during polishing, the width of the pad contact member is large at an outer circumferential side of the polishing pad and is gradually smaller toward the center of the polishing pad. Thus, the pad contact member has a generally triangular planar-shape, and is a plate-like body having a liquid flow passage therein.

The present applicant has obtained the following knowledge through repetition of a process for polishing substrates by a polishing pad whose temperature has been raised by using a pad contact member as described in Japanese Laid-Open Patent Publication No. 2012-176449.

Since the pad contact member is designed to have the largest possible contact area under layout restrictions in order to quickly raise the surface temperature of the polishing pad with the emphasis on an increase of the polishing rate, the temperature of the polishing pad in its entirety can be raised quickly. However, temperature distribution of the polishing pad is such that the increase in the temperature is larger in the outer circumferential portion of the polishing pad than in the central portion of the polishing pad. Thus, it has been found that since the temperature of the polishing pad in its entirety can be raised by the pad contact member, the polishing rate is increased, but the polishing profile is deformed and become the concave. Thus, the central portion of the surface, being polished, of the substrate is polished more than the peripheral portion thereof, resulting in the concave central portion of the substrate. If the temperature of the polishing pad is not raised, the polishing profile is not deformed and does not become the concave. Thus, it has been found that the temperature distribution in the radial direction of the polishing pad and temperature history of the substrate which is experienced during polishing need to be approximated to those as observed in polishing performed without a pad contact member.

SUMMARY OF THE INVENTION

In an embodiment, there is provided a polishing method and a polishing apparatus which can increase a polishing rate and can control a polishing profile of a substrate being polished by adjusting a surface temperature of a polishing pad.

Embodiments, which will be described below, relate to a polishing method and a polishing apparatus for polishing a substrate such as a semiconductor wafer by bringing the substrate into sliding contact with a polishing pad, and more particularly to a polishing method and a polishing apparatus for polishing the substrate while adjusting a surface temperature of the polishing pad.

In order to achieve the object, in an embodiment, there is provided a polishing method for polishing a substrate by pressing the substrate against a polishing pad on a polishing table, comprising: a polishing pad surface temperature adjustment step of adjusting a surface temperature of the polishing pad; and a polishing step of polishing the substrate by pressing the substrate against the polishing pad having the adjusted surface temperature; wherein in the polishing pad surface temperature adjustment step, the surface temperature of a part of an area of the polishing pad, the area being to be brought in contact with the substrate, is adjusted during the polishing step so that the rate of temperature change of a temperature profile in a radial direction of the surface of the polishing pad becomes constant in the radial direction of the polishing pad.

In an embodiment, in the polishing pad surface temperature adjustment step, a temperature profile in the radial direction of the surface of the polishing pad when the substrate is polished under such polishing conditions as to achieve a target polishing profile in a state where the surface temperature of the polishing pad is not adjusted is determined as a reference, and the surface temperature of the part of the area of the polishing pad with which the substrate is brought in contact is adjusted during the polishing step so that the rate of temperature change of the temperature profile in the radial direction of the surface of the polishing pad becomes constant in the radial direction of the polishing pad with respect to the temperature profile determined as the reference.

In an embodiment, the polishing pad surface temperature adjustment step is carried out by heating or cooling the part of the area of the polishing pad by using a pad contact member which is brought in contact with the surface of the polishing pad.

In an embodiment, the temperature profile in the radial direction of the surface of the polishing pad is a temperature distribution in the radial direction of the surface of the polishing pad.

In an embodiment, the rate of temperature change of the temperature profile in the radial direction of the surface of the polishing pad is calculated for each of temperature measurement points on the polishing pad.

In an embodiment, the temperature profile in the radial direction of the surface of the polishing pad is prepared by defining a plurality of areas in the radial direction of the polishing pad, providing at least one temperature measurement point on the polishing pad in each area, and using measured values measured at the temperature measurement points.

In an embodiment, in the case where a plurality of temperature measurement points are provided in the area, the measured values measured at the plural temperature measurement points are used individually or the average value of the measured values is used.

In an embodiment, the part of the area of the polishing pad whose surface temperature is adjusted is variable during the polishing step depending on the rate of temperature change of the temperature profile in the radial direction of the surface of the polishing pad.

In an embodiment, the temperature measurement of the polishing pad is performed by a thermograph or a radiation thermometer.

In an embodiment, the part of the polishing pad whose surface temperature is adjusted is at least one of a plurality of concentric annular areas defined in the radial direction of the polishing pad.

In an embodiment, there is provided a method for determining a temperature adjustment area of a polishing pad, for use in a polishing method for polishing a substrate by pressing the substrate against the polishing pad on a polishing table, comprising: a first step of defining a plurality of concentric annular areas in a radial direction of the polishing pad, selecting the area to adjust the surface temperature from the defined plural areas, adjusting the surface temperature of the selected area to a predetermined temperature, calculating, for each of radial positions on the substrate, an amount of heat that the substrate receives from the polishing pad by contact with the temperature-adjusted polishing pad, calculating, for each of the radial positions on the substrate, an integrated value of the amount of heat during rotation of the substrate from the calculated amount of heat, thereby obtaining a profile of the integrated value of the amount of heat in the radial direction of the substrate, and preparing and accumulating, for each area to adjust the surface temperature, the profile of the integrated value of the amount of heat; a second step of obtaining a temperature profile in the radial direction of the surface of the polishing pad when the substrate is polished under such polishing conditions as to achieve a target polishing profile in a state where the surface temperature of the polishing pad is not adjusted, and calculating, for each of radial positions on the substrate, an integrated value of the amount of heat during rotation of the substrate from the temperature profile, thereby obtaining a profile of the integrated value of the amount of heat in the radial direction of the substrate; and a third step of selecting a profile which is equal or similar to a profile of the integrated value of the amount of heat, obtained by normalizing the profile of the integrated value of the amount of heat obtained in the second step, from profiles of the integrated value of the amount of heat, obtained by normalizing the profiles of the integrated value of the amount of heat accumulated in the first step; wherein an area where the surface temperature of the polishing pad is adjusted is determined based on the profile selected in the third step.

In an embodiment, there are a plurality of areas where the surface temperature of the polishing pad is adjusted, and the plurality of areas have difference temperatures from each other.

In an embodiment, there is provided a polishing method for polishing a substrate by pressing the substrate against a polishing pad on a polishing table, comprising: a first step of defining a plurality of concentric annular areas in a radial direction of the polishing pad, selecting the area to adjust the surface temperature from the defined plural areas, adjusting the surface temperature of the selected area to a predetermined temperature, calculating, for each of radial positions on the substrate, an amount of heat that the substrate receives from the polishing pad by contact with the temperature-adjusted polishing pad, calculating, for each of the radial positions on the substrate, an integrated value of the amount of heat during rotation of the substrate from the calculated amount of heat, thereby obtaining a profile of the integrated value of the amount of heat in the radial direction of the substrate, and preparing and accumulating, for each area to adjust the surface temperature, the profile of the integrated value of the amount of heat; a second step of obtaining a temperature profile in the radial direction of the surface of the polishing pad when the substrate is polished under such polishing conditions as to achieve a target polishing profile in a state where the surface temperature of the polishing pad is not adjusted, and calculating, for each of radial positions on the substrate, an integrated value of the amount of heat during rotation of the substrate from the temperature profile, thereby obtaining a profile of the integrated value of the amount of heat in the radial direction of the substrate; a third step of selecting a profile which is equal or similar to a profile of the integrated value of the amount of heat, obtained by normalizing the profile of the integrated value of the amount of heat obtained in the second step, from profiles of the integrated value of the amount of heat, obtained by normalizing the profiles of the integrated value of the amount of heat accumulated in the first step; and a fourth step of determining an area where the surface temperature of the polishing pad is adjusted based on the profile selected in the third step, and polishing the substrate by pressing the substrate against the polishing pad while adjusting the surface temperature of the determined area of the polishing pad.

In an embodiment, there are a plurality of areas where the surface temperature of the polishing pad is adjusted, and the plurality of areas have difference temperatures from each other.

In an embodiment, the temperature profile in the radial direction of the surface of the polishing pad is prepared during the polishing of the substrate.

In an embodiment, the temperature profile in the radial direction of the surface of the polishing pad is a temperature distribution in the radial direction of the surface of the polishing pad.

In an embodiment, the rate of temperature change of the temperature profile in the radial direction of the surface of the polishing pad is calculated for each of temperature measurement points on the polishing pad.

In an embodiment, the area of the polishing pad whose surface temperature is adjusted is variable depending on the rate of temperature change during the polishing of the substrate.

In an embodiment, the temperature measurement of the polishing pad is performed by a thermograph or a radiation thermometer.

In an embodiment, there is provided a polishing apparatus for polishing a substrate by pressing the substrate against a polishing pad on a polishing table, comprising: a top ring configured to press the substrate against the polishing pad on the polishing table; and a pad temperature adjustment mechanism configured to adjust a surface temperature of the polishing pad; wherein the pad temperature adjustment mechanism comprises a pad contact member configured to be brought in contact with the surface of the polishing pad, and a liquid supply system configured to supply a temperature-adjusted liquid to the pad contact member; and wherein the temperature-adjusted liquid comprises heated water or cold water, and the healed water and the cold water are supplied selectively, without being mixed, to the pad contact member by valve switching.

In an embodiment, when the valve switching is performed, the cold water is supplied to the pad contact member after returning the heated water, remaining in the pad contact member and piping, to the liquid supply system.

In an embodiment, when the valve switching is performed, the heated water is supplied to the pad contact member after discharging the cold water remaining in the pad contact member and piping.

In an embodiment, there is provided a polishing apparatus for polishing a substrate by pressing the substrate against a polishing pad on a polishing table, comprising: a top ring configured to press the substrate against the polishing pad on the polishing table; and a pad temperature adjustment mechanism configured to adjust a surface temperature of the polishing pad; wherein the pad temperature adjustment mechanism comprises a pad contact member configured to be brought in contact with the surface of the polishing pad to heat or cool the polishing pad; and wherein the pad contact member has a plurality of areas whose temperatures can be adjusted individually, and a temperature profile in a radial direction of the surface of the polishing pad can be adjusted by adjusting the temperature of at least one of the plurality of areas.

In an embodiment, heated water or cold water can be supplied to each of the plurality of areas of the pad contact member at a controlled flow rate.

The above-described embodiments achieve the following advantageous effects:

1) By adjusting the surface temperature of the polishing pad, it becomes possible to control the polishing profile while increasing the polishing rate.

2) The polishing profile of a film, being polished, of the substrate can be adjusted, without measuring the thickness of the film, based on data obtained by a method for measuring the surface temperature of the polishing pad.

3) The temperature history of the substrate can be controlled by supplying liquids at different flow rates to the respective areas of the pad contact member. Further, the temperature history of the substrate can be controlled by moving the pad contact member and adjusting the temperature of the polishing pad.

BRIEF DESCRIPTION OF THE DRAWINGS

FIG. 3A is a view showing a conventional pad contact member, a polishing pad and a substrate (wafer) to be polished, and FIG. 3B is a perspective view showing the pad contact member of FIG. 3A and FIG. 3C is a plan view showing the configuration of a flow passage formed in the interior of the pad contact member shown in FIG. 3B;

FIG. 6A is a perspective view of the pad contact member, and FIG. 6B is a perspective view showing a configuration of a flow passage formed in the interior of the pad contact member and FIG. 6C is a view showing the heating area in the case where the pad contact member configured as shown in FIGS. 6A and 6B is used;

FIG. 20A is a diagram showing a liquid supply system for selectively supplying heated water and cold water to the pad contact member, and FIG. 20B is a diagram showing the states of the respective valves when performing switching from the supply of heated water to the supply of cold water and switching from the supply of cold water to the supply of heated water; and FIGS. 21A and 21B are views showing a method for controlling switching between the supply of heated water and the supply of cold water in order to control the surface temperature of the polishing pad at a preset temperature.

DESCRIPTION OF EMBODIMENTS

Figure 1:
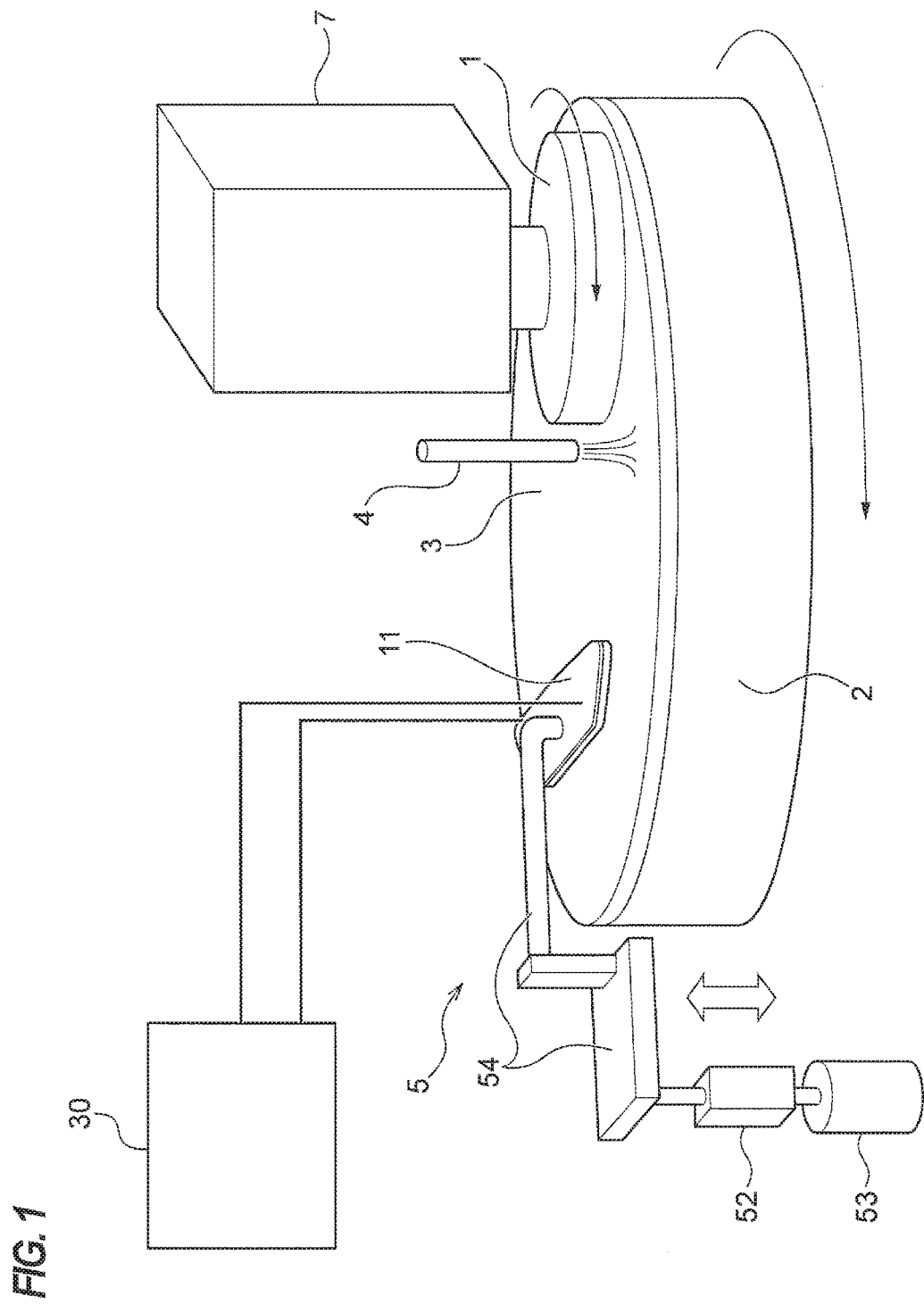
FIG. 1 is a schematic view showing a polishing apparatus according to an embodiment.

Embodiments of a polishing apparatus will be described below with reference to FIGS. 1 through 21B. In FIGS. 1 through 21B, identical or corresponding components will be denoted by identical reference numerals, and repetitive descriptions thereof are omitted.

FIG. 1 is a schematic view of a polishing apparatus according to an embodiment. As shown in FIG. 1, the polishing apparatus includes a top ring 1 for holding and rotating a substrate such as a semiconductor wafer, a polishing table 2 for supporting a polishing pad 3 thereon, a polishing liquid supply mechanism 4 for supplying a polishing liquid (e.g., slurry) onto a surface of the polishing pad 3, and a pad temperature adjustment mechanism 5 for adjusting a surface temperature of the polishing pad 3.

The top ring 1 is supported by polishing head support arm 7, which is provided with a pneumatic cylinder and a motor (not shown) that move the top ring 1 vertically and rotate the top ring 1 about its own axis. The substrate is held on a lower surface of the top ring 1 by vacuum suction or other means. The polishing table 2 is coupled to a motor (not shown), so that the polishing table 2 can rotate in a direction indicated by arrow.

The substrate to be polished is held by the top ring 1 and further rotated by the top ring 1. On the other hand, the polishing pad 3 is rotated about its own axis together with the polishing table 2. In this state, the polishing liquid is supplied onto a surface of the polishing pad 3 from the polishing liquid supply mechanism 4 and a surface of the substrate is pressed against the surface of the polishing pad 3 (i.e., substrate polishing surface) by the top ring 1. The surface of the substrate is polished by sliding contact between the polishing pad 3 and the substrate in the presence of the polishing liquid.

The pad temperature adjustment mechanism 5 includes a pad contact member 11 that is brought into contact with the surface of the polishing pad 3, and a liquid supply system 30 for supplying a temperature-controlled liquid to the pad contact member 11. The pad contact member 11 is coupled to a pneumatic cylinder 52 through an arm 54. This pneumatic cylinder 52 serves as an elevating mechanism for raising and lowering the pad contact member 11. Further, the pad contact member 11 is coupled to a motor 53 serving as a moving mechanism, so that the pad contact member 11 is moved between a predetermined raised position located above the polishing pad 3 and a predetermined retreat position located radially outwardly of the polishing table 2.

Figure 2:
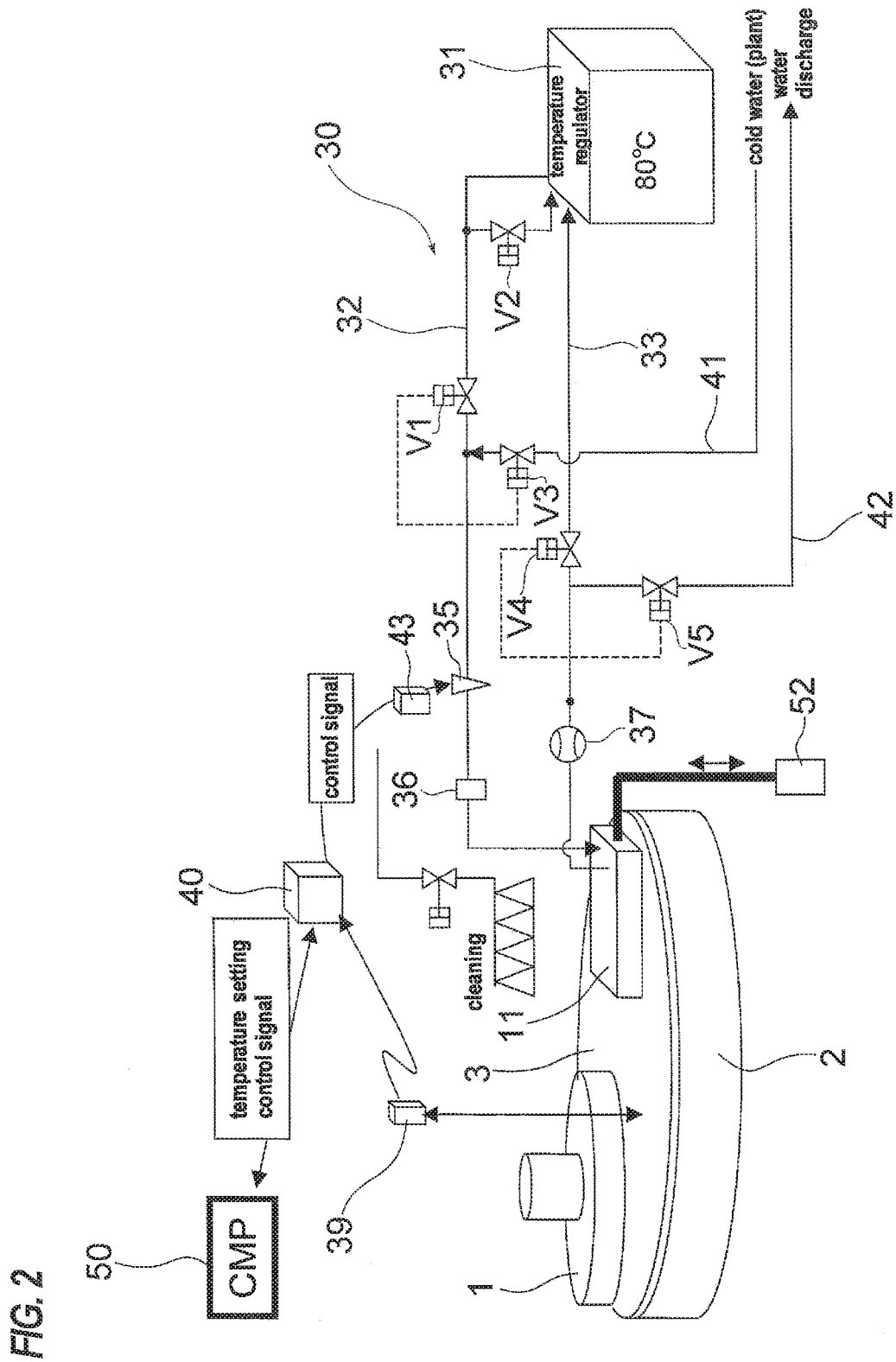
FIG. 2 is a schematic view showing a liquid supply system for supplying a liquid to a pad contact member.

FIG. 2 is a schematic view showing the liquid supply system 30 for supplying the liquid to the pad contact member 11. This liquid supply system 30 has a liquid supply tank 31, and a supply line 32 and a return line 33 for coupling the liquid supply tank 31 and the pad contact member 11 to each other. The liquid, as a heating medium, is supplied to the pad contact member 11 from the liquid supply tank 31 through the supply line 32, and is returned from the pad contact member 11 to the liquid supply tank 31 through the return line 33. In this manner, the liquid circulates between the liquid supply tank 31 and the pad contact member 11. The liquid supply tank 31 has a heater (not shown) for heating the liquid, and thus the liquid is heated to a predetermined temperature by the heater. Specifically, the liquid supply tank 31 serves as a temperature regulator.

The liquid supply system 30 includes a flow rate regulating valve 35 for regulating a flow rate of the liquid flowing through the supplying line 32, a pressure gauge 36 for measuring the pressure of the liquid that has passed through the flow rate regulating valve 35, and a flowmeter 37 for measuring a flow rate of the liquid flowing through the return line 33. The liquid supply system 30 further includes a radiation thermometer 39 serving as a pad surface thermometer for measuring the surface temperature of the polishing pad 3, and a temperature controller 40 for controlling the flow rate regulating valve 35 based on the pad surface temperature measured by the radiation thermometer 39. The flow rate of the liquid flowing through the supply line 32 is regulated by an opening degree of the valve determined by supplying an air pressure controlled by an electropneumatic regulator 43 to the flow rate regulating valve 35. A cooling water line 41 is connected to the supply line 32, and thus cooling water can be supplied to the supply line 32 from the cooling water line 41. Further, a discharge line 42 is connected to the return line 33, and thus the liquid flowing through the return line 33 can be discharged therefrom.

The radiation thermometer 39 is designed to measure the surface temperature of the polishing pad 3 in a noncontact manner and send the measured value of the surface temperature to the temperature controller 40. The temperature controller 40 controls the electropneumatic regulator 43 based on the measured value of the surface temperature of the polishing pad 3 so that the surface temperature of the polishing pad 3 becomes a preset target temperature. The electropneumatic regulator 43 supplies an air pressure controlled based on a control signal from the temperature controller 40 to the flow rate regulating valve 35. The opening degree of the flow rate regulating valve 35 is regulated by the air pressure supplied from the electropneumatic regulator 43, and the flow rate of the liquid supplied to the pad contact member 11 is controlled. The surface temperature of the polishing pad 3 is adjusted by the heat exchange between the liquid flowing through the pad contact member 11 and the polishing pad 3.

By performing such a feedback control, the surface temperature of the polishing pad 3 is maintained at the predetermined target temperature. A PID controller can be used as the temperature controller 40. The target temperature of the polishing pad 3 is determined by a CMP controller 50 depending on a type of the substrate or a polishing process. The determined temperature setting control signal is inputted to the temperature controller 40.

As described above, the surface temperature of the polishing pad 3 is controlled by regulating the flow rate of the liquid to be supplied to the pad contact member 11. Water is used as the liquid (heating medium) to be supplied to the pad contact member 11. The water is heated by the heater of the liquid supply tank 31 to, for example, about 80° C., thus becoming heated water. In order to increase the surface temperature of the polishing pad 3 more rapidly, a silicone oil may be used as the heating medium. In the case where the silicone oil is used, the silicone oil is heated by the heater of the liquid supply tank 31 to 100° C. or more (for example, about 120° C.). In order to enable heated water and cooling water to be supplied interchangeably by switching to the pad contact member 11, the supply line 32, the return line 33, the cooling water line 41, the discharge line 42, and the like have respective valves V1 to V5 (described later).

The pad contact member 11 employed in the pad temperature adjustment mechanism 5 will now be described.

The present inventors have invented the pad contact member 11 shown in FIG. 1 by variously changing the heating area of a polishing pad using a pad contact member as described in Japanese Laid-Open Patent Publication No. 2012-176449. A process for developing the invention will be described below.

FIG. 3A is a view showing a conventional pad contact member 111, a polishing pad 3 and a substrate (wafer) W to be polished. FIG. 3B is a perspective view showing the pad contact member 111 of FIG. 3A, and FIG. 3C is a plan view showing the configuration of a flow passage formed in the interior of the pad contact member 111 shown in FIG. 3B.

As shown in FIG. 3A, the pad contact member 111, which comprises a plate-shaped body having a generally triangular-planar shape and having a flow passage in its interior, can be brought into contact with the polishing pad 3 from an outer circumferential side to a central part of the polishing pad 3. The substrate (wafer) W to be polished is positioned on the opposite side of the pad contact member 111 across the center (O) of the polishing pad 3.

As shown in FIG. 3B, the pad contact member 111 includes a plate member 115 having a contact surface which is brought into contact with the surface of the polishing pad 3, and a flow passage-forming member 116 which has a liquid flow passage formed therein. The plate member 115 is fixed to the lower part of the flow passage-forming member 116. A liquid inflow port 123 and a liquid discharge port 124 are formed in the upper surface of the flow passage-forming member 116.

As shown in FIG. 3C, a partition 118 extending in the radial direction of the polishing pad 3 is provided in the interior of the flow passage-forming member 116. The interior space of the flow passage-forming member 116 is divided by the partition 118 into a first liquid flow passage 121 and a second liquid flow passage 122. The first liquid flow passage 121 and the second liquid flow passage 122 are connected in series. More specifically, a downstream end of the first liquid flow passage 121 is connected to an upstream end of the second liquid flow passage 122. The first liquid flow passage 121 communicates with the liquid inflow port 123, and the second liquid flow passage 122 communicates with the liquid discharge port 124. A plurality of baffles 125 are disposed in each of the first liquid flow passage 121 and the second liquid flow passage 122.

A liquid is supplied to the first liquid flow passage 121 via the liquid inflow port 123. The liquid flows through the first liquid flow passage 121 and the second liquid flow passage 122 in this order, so that the heat exchange is performed between the liquid and the polishing pad 3. The liquid is discharged from the liquid discharge pork 124.

Figure 4A:
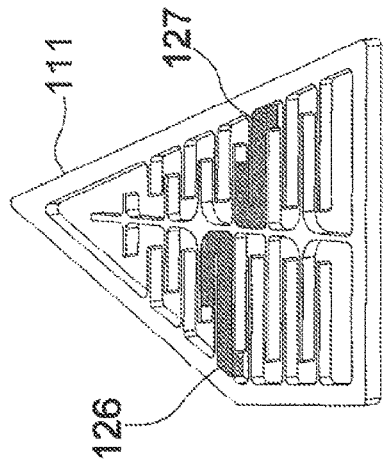
FIG. 4A is a perspective view showing the entire pad contact member.
Figure 4B:
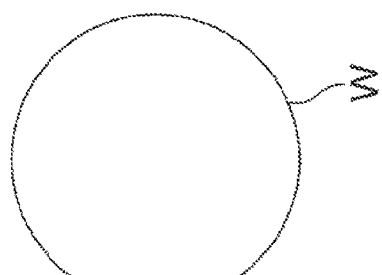
FIG. 4B is a view showing the flow passage in the pad contact member and the sealing members placed in the flow passage and FIG. 4C is a view showing the heating area in the case where the improved pad contact member having the modified flow passage is used.

FIGS. 4A and 4B are views showing the state in which the flow passage in the pad contact member 111 is changed by placing sealing members in the interior of the pad contact member 111 shown in FIGS. 3B and 3C. FIG. 4A is a perspective view showing the entire pad contact member 111, and FIG. 49 is a view showing the flow passage in the pad contact member 111 and the sealing members placed in the flow passage.

As shown in FIG. 4A, in addition to the liquid inflow port (shown with "IN (original)" in the drawing) and the liquid discharge port (shown with "OUT (original)" in the drawing) formed in the original pad contact member 111, one liquid inflow port (shown with "IN (additional work)" in the drawing) and two liquid discharge ports (shown with "OUT (additional work)" in the drawing) are formed.

Further, as shown in FIG. 4B, sealing members 126, 127 are placed in the flow passage of the pad contact member 111. In the improved pad contact member 111 having the sealing members 126, 127, the liquid that has flowed therein from the liquid inflow port (IN (additional work)) flows out from the two additional liquid discharge ports (OUT (additional work)). The liquid (heated water) flows only in the interior of the triangular plate-shaped portion located at the upper side of the pad contact member 111, and does not flow in the interior of the generally trapezoidal plate-shaped portion located at the lower side of the pad contact member 111.

Figure 4C:
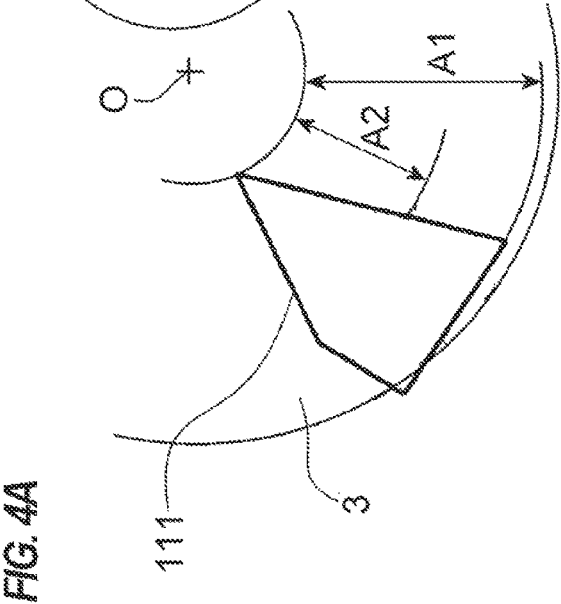

FIG. 4C is a view showing the heating area in the case where the improved pad contact member 111 having the modified flow passage shown in FIGS. 4A and 4B is used. As shown in FIG. 4C, the heating area is a concentric annular area A1 on the polishing pad 3 in the case where the conventional pad contact member 111 is used, whereas the heating area is a concentric annular area A2 on the polishing pad 3 in the case where the improved pad contact member 111 is used. Thus, the outer circumferential side of the polishing pad 3 is not heated when the improved pad contact member 111 is used. In FIG. 4C, a substrate (wafer) W to be polished is positioned on the opposite side of the pad contact member 111 across the center (O) of the polishing pad 3.

Figure 5A:
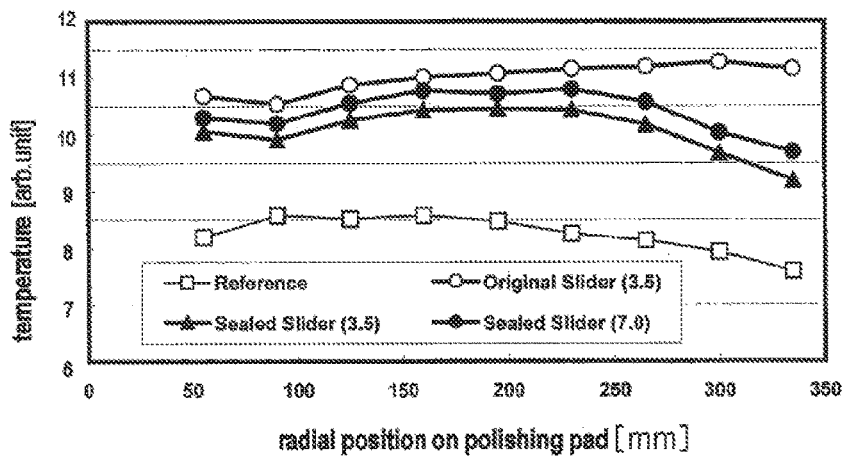
FIGS. 5A, 5B and 5C are graphs showing the confirmed results of the effects by the change of the heating area in the case where the improved pad contact member is used against the conventional pad contact member.
Figure 5B:
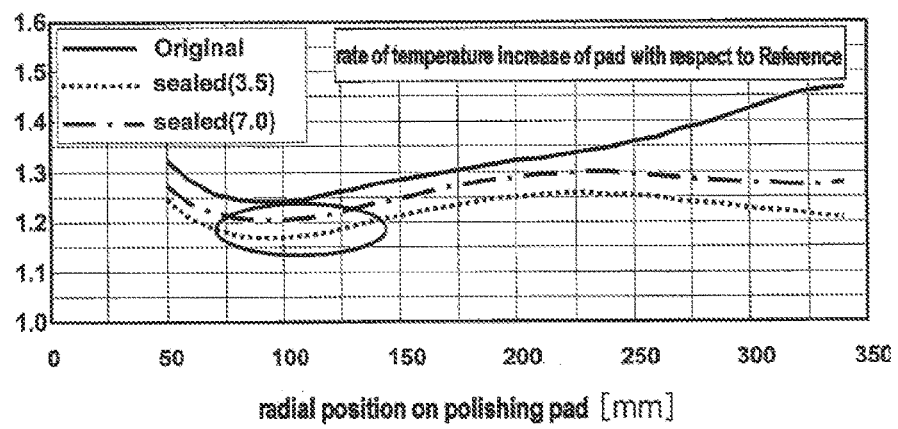
Figure 5C:
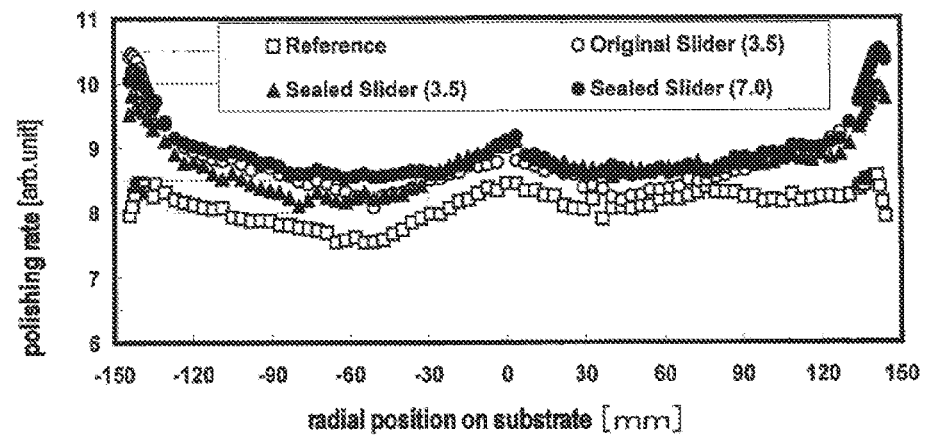

FIGS. 5A, 5B and 5C are graphs showing the confirmed results of the effects by the change of the heating area in the case where the improved pad contact member 111 is used against the conventional pad contact member 111.

In FIGS. 5A, 5B and 5C, "Reference" indicates data in the case of not using a pad contact member, "Original Slider (3.5)" indicates data in the case of using the conventional pad contact member shown in FIGS. 3A, 3B and 3C, and "Sealed Slider (3.5)" and "Sealed Slider (7.0)" indicate data in the case of using the improved pad contact member shown in FIGS. 4A and 4B. In the cases of "Sealed Slider (3.5)" and "Sealed Slider (7.0)", the liquid was allowed to flow in the improved pad contact member at a flow rate of 3.5 liters/min and 7.0 liters/min, respectively. In either case, the liquid was supplied from IN (additional work), and discharged from both of the two OUT (additional work).

When the temperature of the polishing pad became stable after a substrate (wafer) W starts to be polished, in particular after 50 seconds had elapsed since the start of polishing, the temperature of the surface of the polishing pad was measured. The polishing time was 60 seconds. FIG. 5A shows the measured results of the temperature of the polishing pad, at 9 equally spaced-apart points from a point at a distance of about 50 mm to a point at a distance of about 340 mm in the radial direction from the center of the polishing pad. In FIG. 5A, the temperature shown on the vertical axis is expressed in arbitrary unit. Temperature in the present embodiments is hereinafter expressed in arbitrary unit as with in FIG. 5A. As is clear from FIG. 5A, in the case of "Original Slider (3.5)", the temperature increase of the polishing pad is larger in the outer circumferential part of the polishing pad than in the central part of the polishing pad. In the cases of "Sealed Slider (3.5)" and "Sealed Slider (7.0)", while the rate of temperature increase of the polishing pad is slightly smaller as compared to the case of "Original Slider (3.5)", the temperature increase in the outer circumferential part, of the polishing pad is suppressed and the temperature distribution thereof comes close to the temperature distribution in the case of "Reference" having no pad contact member. However, even in the cases of "Sealed Slider (3.5)" and "Sealed Slider (7.0)", the rate of temperature increase is small in an area from about 75 mm to about 150 mm in the distance from the center of the polishing pad. Specifically, it is understood that there is an area where the rate of temperature increase is not constant, i.e., is small, compared to the case of "Reference" where a pad contact member is not used. The rate of temperature increase herein refers to the rate of temperature change showing how much the temperature increases and changes at respective points in the radial direction of the polishing pad, as compared to the temperature profile of the polishing pad in the radial direction of the polishing pad in the case where a pad contact member is not used.

FIG. 5B shows the rate of temperature increase (rate of temperature change) of the polishing pad in the case where the pad contact member is used, compared to the case where a pad contact member is not used. The horizontal axis represents the distance from the center of the polishing pad (radial position on the polishing pad), and the vertical axis represents the rate of temperature increase of the polishing pad by using the temperature of "Reference" having no pad contact member as the criterion of 1. The data shown in FIG. 5B is obtained by using the data on the temperature of the polishing pad shown in FIG. 5A. As is clear also from FIG. 5B, in the case of "Original Slider (3.5)", the rate of temperature increase of the polishing pad is larger in the outer circumferential portion of the polishing pad. In the cases of "Sealed Slider (3.5)" and "Sealed Slider (7.0)", the rate of temperature increase in the outer circumferential portion of the polishing pad is suppressed, and the temperature profile is close to a fairly flat line. Further, it is more clearly shown in FIG. 5B that the rate of temperature increase in the area (surrounded by the ellipse in FIG. 5B) from about 75 mm to about 150 mm in the distance from the center of the polishing pad is lowered.

FIG. 5C shows the polishing rate when 50 seconds have elapsed since the start of polishing of the wafer W. In FIG. 5C, the polishing rate on the vertical axis is expressed in arbitrary unit. In the embodiments, hereinafter, the polishing rate is expressed in arbitrary unit as with FIG. 5C. The polishing time was 60 seconds. As is clear from FIG. 5C, the polishing rate increases in all of the cases where the pad contact member is used. From the viewpoint of polishing profile, the distribution profile of the polishing rate is preferably as close as possible to the distribution profile of the polishing rate in the case of "Reference" where a pad contact member is not used. Except for an area around the outer circumferential portion of the wafer W, the distribution profile of the polishing rate in the cases of "Sealed Slider (3.5)" and "Sealed Slider (7.0)" is close to that in the case of "Reference". However, there is a considerable variation in the distribution profile of the "Original Slider (3.5)".

From the experiments shown in FIGS. 5A, 5B and 5C which were conducted using the conventional pad contact member 111 and the unproved pad contact member 111, the present inventors have found that, by using the improved pad contact member 111, over-polishing of the central area of the substrate can be avoided, and thus the polishing profile can be brought close to that in the case of not using a pad contact member. The present inventors have also found that when an area of the polishing pad, whose distance from the center of the polishing pad ranges from about 75 mm to about 150 mm, is heated to a little more, then the polishing profile can be brought further closer to that in the case of not using a pad contact member.

Specifically, it has been found that, by controlling the temperature (heating) of a predetermined area in a radial direction of the polishing pad, the rate of temperature increase (rate of temperature change) at respective points in the radial direction of the polishing pad surface, by using the temperature profile, as a reference, in the radial direction of the polishing pad surface in the case of not using a pad contact member, can be made constant over the radial direction of the polishing pad.

Figure 6A:
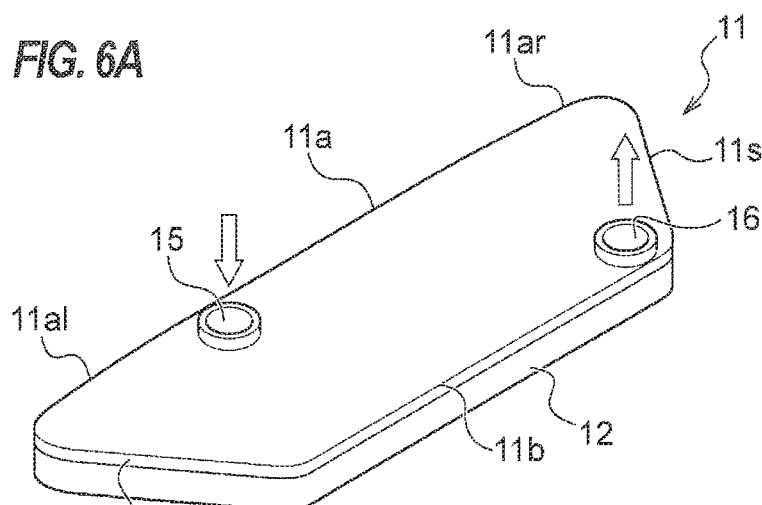
FIGS. 6A and 6B are views showing a pad contact member according to an embodiment.
Figure 6B:
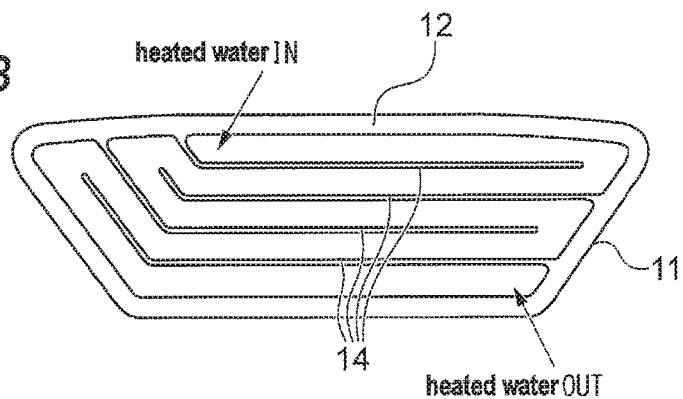

FIGS. 6A and 6B are views showing a pad contact member 11 according to an embodiment which has been invented based on the above knowledge. FIG. 6A is a perspective view of the pad contact member 11, and FIG. 6B is a perspective view showing a configuration of a flow passage formed in the interior of the pad contact member 11.

As shown in FIG. 6A, the pad contact member 11 of the embodiment is a plate-shaped body having a planar shape of a generally trapezoidal shape and having a flow passage therein. Specifically, the pad contact member 11 has an upper side 11a, a lower side 11b, and right and left sides 11s, 11s, and has a planar shape of a generally trapezoidal shape, with the upper side 11a and the lower side 11b being parallel. Further, both end portions of the upper surface 11a of the pad contact member 11 are inclined with respect to the central portion, thus forming inclined sides 11al, 11ar. Therefore, the planar shape of the pad contact member 11 should be called a deformed hexagonal shape.

As shown in FIG. 6A, the pad contact member 11 of the embodiment includes a flow passage-forming member 12 having a liquid flow passage formed therein and having a lower surface which is brought into contact with the surface of the polishing pad 3, and a plate member 13 fixed to the upper surface of the flow passage-forming member 12. A liquid inflow port 15 and a liquid discharge port 16 are formed in the upper surface of the flow passage-forming member 13.

FIG. 6B is a plan view showing the flow passage-forming member 12. As shown in FIG. 6B, a plurality of partitions 14, which extend horizontally and are bent upward at the left ends, are formed in the flow passage-forming member 12. The plural partitions 14, at the ends of the horizontal portions or at the upper ends of the bent portions, are connected to an outer frame. These partitions 14 form a single multi-folded zigzag flow passage. Referring to FIG. 6B, the portion shown as "HEATED WATER IN" communicates with the liquid inflow port 15, so that a liquid (heated water) flows in from the above portion. The portion shown as "HEATED WATER OUT" communicates with the liquid discharge port 16, so that the liquid (heated water) flows out from the above portion.

Figure 6C:
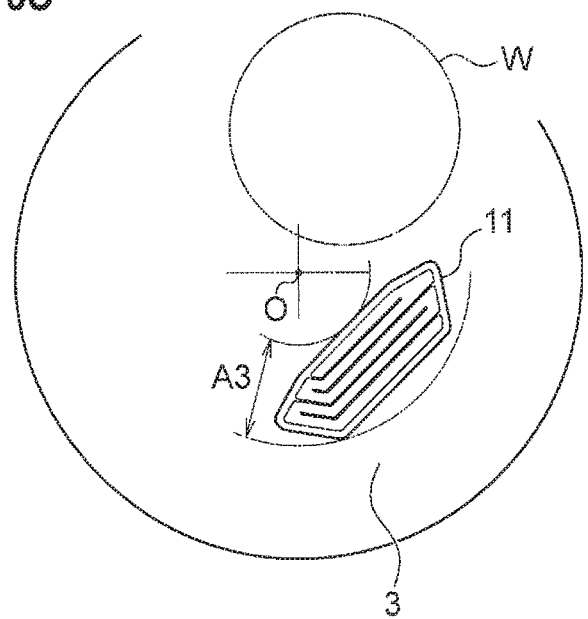

FIG. 6C is a view showing the heating area in the case where the pad contact member 11 configured as shown in FIGS. 6A and 6B is used. As shown in FIG. 6C, when the pad contact member 11 is used, the heating area is a concentric annular area A3 on the polishing pad 3. Thus, by using the pad contact member 11 of the embodiment, the outer circumferential side of the polishing pad 3 will not be heated. In FIG. 6C, the pad contact member 11 and the substrate (wafer) W to be polished are positioned so as to sandwich the center (O) of the polishing pad 3 therebetween.

Figure 7:
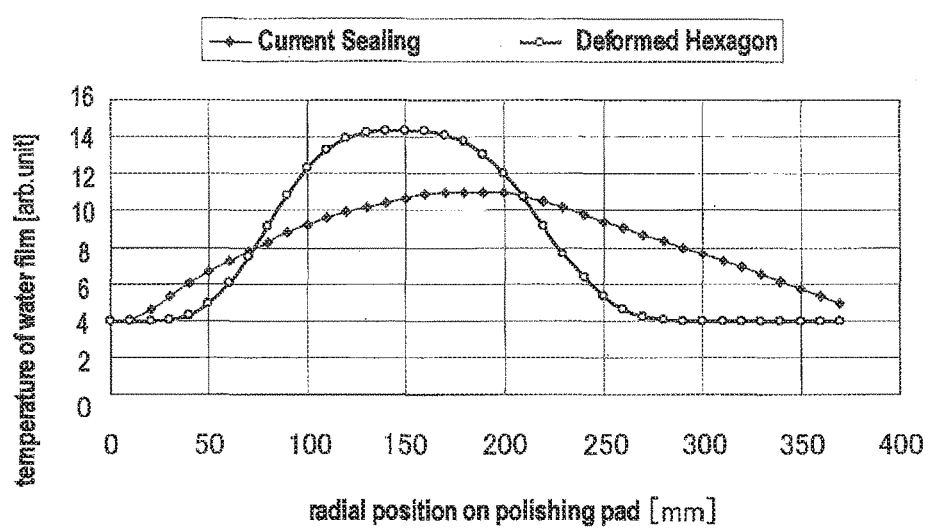
FIG. 7 is a graph showing comparative data between the pad temperature distribution obtained by thermal analysis result in the case where the improved pad contact member shown in FIGS. 4A and 4B is used and the pad temperature distribution obtained by thermal analysis result in the case where the pad contact member of the embodiment shown in FIGS. 6A and 6B is used, and is a graph showing the relationship between a radial position (mm) on the polishing pad and the temperature (° C.) of a water film on the polishing pad.

FIG. 7 is a graph showing comparative data between the pad temperature distribution obtained by thermal analysis result in the case where the improved pad contact member 111 shown in FIGS. 4A and 4B is used and the pad temperature distribution obtained by thermal analysis result in the case where the pad contact member 11 of the embodiment shown in FIGS. 6A and 6B is used, and is a graph showing the relationship between a radial position (mm) on the polishing pad and the temperature (° C.) of a water film on the polishing pad.

In FIG. 7, "Current Sealing" indicates data in the case of using the Sealed. Slider (3.5) described in FIGS. 5A, 5B and 5C, and "Deformed Hexagon" indicates data in the case of using the pad contact member 11 of the embodiment shown in FIGS. 6A and 6B.

As is clear from FIG. 7, in the case of "Current Sealing" where the Sealed Slider (3.5) is used, the temperature of the water film on the polishing pad gently increases until the radial position on the polishing pad reaches about 150 mm, and is kept approximately constant until the radial position reaches about 200 mm, and then gradually decreases when the radial position becomes larger than 200 mm. On the other hand, in the case of "Deformed Hexagon" where the pad contact member 11 of the embodiment is used, the temperature of the water film on the polishing pad starts to increase from where the radial position on the polishing pad reaches about 50 mm, and reaches the maximum temperature at the radial position of 150 mm or thereabout, and then decreases gradually as the radial position becomes larger than 150 mm, and then becomes constant from where the radial position exceeds 250 mm. In the radial position range of about 75 mm to about 200 mm, the temperature of the water film on the polishing pad is higher in the case of "Deformed Hexagon" than in the case of "Current Sealing". In this manner, the change in the shape of the pad contact member produces a significant effect on the temperature of the water film on the polishing pad.

FIGS. 8A through 8E are views showing the evaluation results in the case where the pad contact member 11 of the embodiment shown in FIGS. 6A and 6B is moved radially on the polishing pad 3. In FIGS. 8A through 8E, "Ref without Slider" indicates the evaluation results in the case of not using a pad contact member, and "New Type 0 mm", "New Type 50 mm" and "New Type 100 mm" indicate the evaluation results in the case where the pad contact member 11 of the embodiment was placed on the polishing pad 3 at the various radial positions shown in FIG. 9. In FIG. 9, the symbols C1, C2 and C3 represent concentric circles centered at the center (O) of the polishing pad 3 and having different radii (R): the radius R of the circle C1 is 190 mm the radius R of the circle C2 is 240 mm; and the radius R of the circle C3 is 290 mm. The concentric circle C1 is a concentric circle that passes through the center of the substrate W to be polished.

In the case of "New Type 0 mm", the pad contact member 11 is placed on the polishing pad 3 such that the midpoint of the lower side 11b of the pad contact member 11 accords with the concentric circle C1. In the case of "New Type 50 mm", the pad contact member 11 is placed on the polishing pad 3 such that the midpoint of the lower side 11b of the pad contact member 11 accords with the concentric circle C2 which is shifted radially outward by 50 mm from the concentric circle C1. In the case of "New Type 100 mm" the pad contact member 11 is placed on the polishing pad 3 such that the midpoint of the lower side 11b of the pad contact member 11 accords with the concentric circle C3 which is shifted radially outward by 100 mm from the concentric circle C1.

Figure 8A:
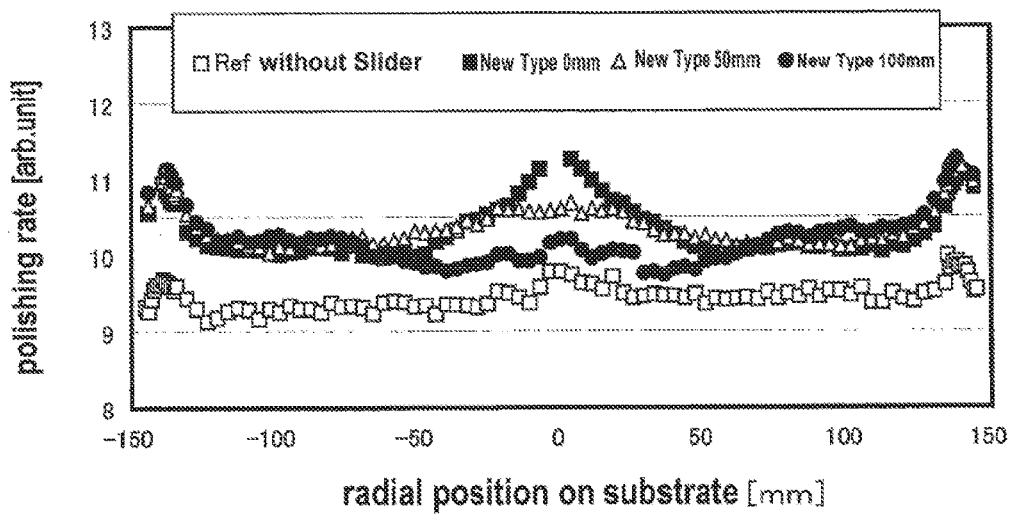
FIGS. 8A through 8E are views showing the evaluation results in the case where the pad contact member of the embodiment shown in FIGS. 6A and 6B is moved radially on the polishing pad.
Figure 9:
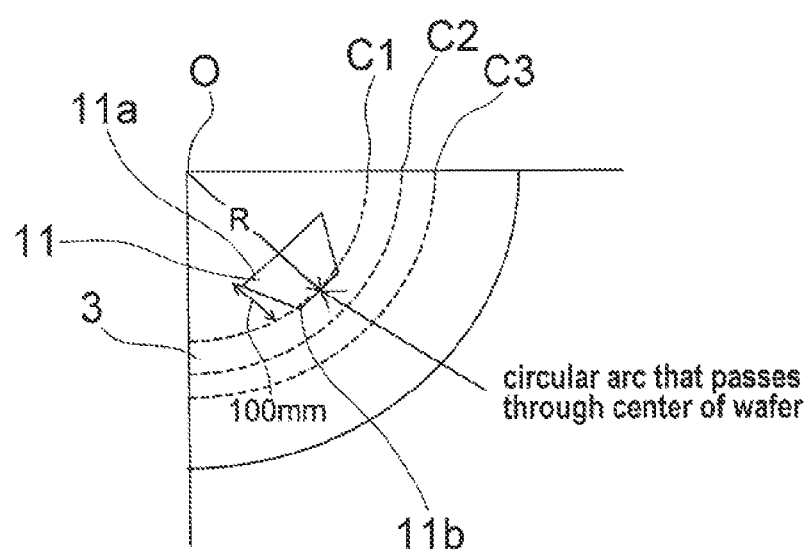
FIG. 9 is a view showing arrangement position of the pad contact member on the polishing pad using concentric circles.

FIG. 8A is a graph showing the relationship between a radial position on the substrate and the polishing rate.

As is clear from FIG. 8A, the polishing rate is higher in the cases of "New Type 0 mm", "New Type 50 mm" and "New Type 100 mm" where the pad contact member 11 is used than in the case of "Ref without Slider" where the pad contact member is not used. In an area of the substrate around the radial position of ±140 mm, i.e., in an edge area of the substrate, the distribution profiles of the polishing rate in the cases of "New Type 0 mm", "New Type 50 mm" and "New Type 100 mm" are similar to that in the case of "Ref without Slider". Thus, it would appear that the use of the pad contact member has little effect on the polishing profile in the edge area of the substrate. On the other hand, in the central area of the substrate, the polishing rate in the case of "New Type 0 mm" is the highest, the polishing rate in the case of "New Type 50 mm" is the second highest, and the polishing rate in the case of "New Type 100 mm" is the lowest. Thus, it is understood that the installation position of the pad contact member has a considerable effect on the polishing profile in the central area of the substrate. Here, the distribution of the polishing rate in the case of "New Type 50 mm" is closest to that in the case of "Ref without Slider", and the polishing profile of the substrate becomes flatter in the case of "New Type 50 mm".

Figure 8B:
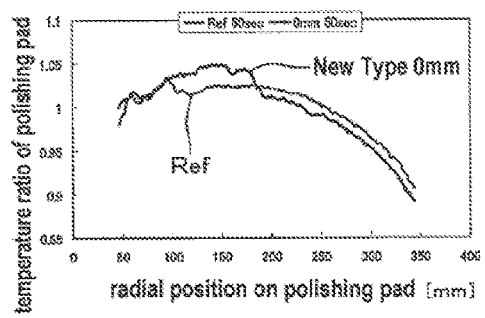
Figure 8C:
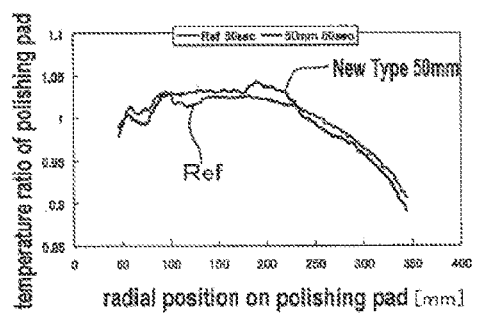
Figure 8D:
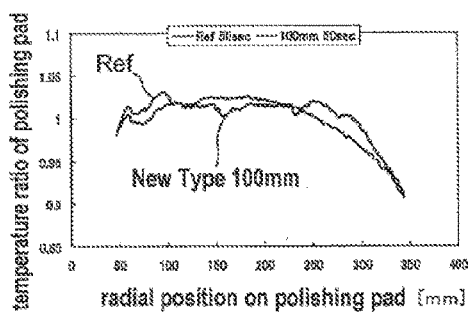

FIGS. 8B, 8C and 8D show the relationship between a radial position on the polishing pad and the temperature ratio of the polishing pad when 50 seconds have elapsed since the start of polishing of the substrate. FIG. 8B shows data in the case of not using a pad contact member (Ref) and data in the case of "New Type 0 mm", FIG. 8C shows data in the case of not using a pad contact member (Ref) and data in the case of "New Type 50 mm", and FIG. 8D shows data in the case of not using a pad contact member (Ref) and data in the case of "New Type 100 mm". The temperature ratio of the polishing pad is determined by using the temperature at a measurement point closest to the center of the polishing pad as the criterion of 1 in the case of using "New Type 0 mm". The range of radial position on the polishing pad in which the temperature is measured corresponds to the range in which the substrate is brought into contact with the polishing pad.

As is clear from FIGS. 8B through 8D, it is understood that the temperature of the polishing pad is higher in the case of using the pad contact member than in the case of not using a pad contact member, the location of temperature increase changes with the movement of the installation position of the pad contact member, and in either case the temperature ratio of the polishing pad becomes not more than 1 when the radial position on the polishing pad exceeds 230 mm, and then the pad temperature decreases as the radial position comes closer to the outer circumferential portion of the polishing pad. Of the cases "New Type 0 mm". "New Type 50 mm" and "New Type 100 mm", the distribution of the temperature ratio of the polishing pad in the case of "New Type 50 mm" shown in FIG. 8B is closest to that in the case of not using a pad contact member (Ref).

Figure 8E:
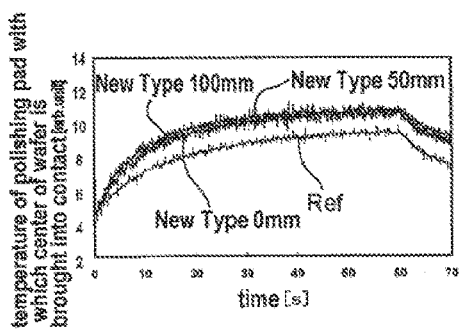

FIG. 8E shows a change with time of the temperature of the polishing pad in a portion with which the center of the substrate (wafer) is brought into contact. All the cases "New Type 0 mm", "New Type 50 mm" and "New Type 100 mm" show substantially the same profile of the change in the pad temperature so as to overlap one another, though there is a slight difference between the respective profiles, and shows the profiles of the change similar to the profile of the change in the case of "Ref".

As shown in FIGS. 8B, 8C and 8D, the surface temperature of the polishing pad 3 heated by the pad contact member 11 varies with the radial position on the polishing pad 3. As described above with reference to FIG. 9, the center of the substrate W to be polished is positioned on the concentric circle C1. The top ring 1 holding the substrate W remains at the position shown in FIG. 1 during polishing, and therefore the center of the substrate W is positioned on the concentric circle C1 at all times. Because the substrate W being polished rotates about the center of the substrate by the rotation of the top ring 1, the point on the polishing pad 3 which is brought in contact with a particular point on the substrate, located at a distance from the center of the substrate, changes with every moment. In other words, the particular point on the substrate comes into contact with different points on the polishing pad 3 located at different radial positions every moment. Because the surface temperature of the polishing pad 3 varies with the radial position on the polishing pad 3, respective points on the substrate each momentarily come into contact with different temperatures. The substrate is thus subjected to a temperature history.

Figure 10A:
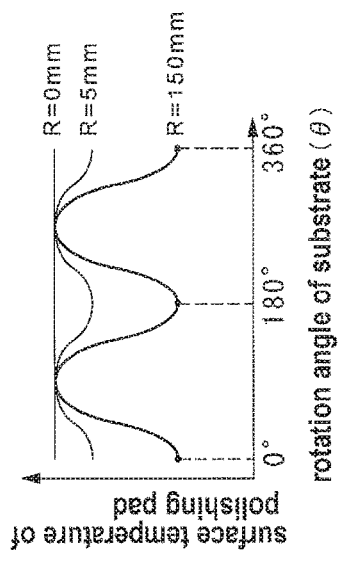
FIGS. 10A, 10B and 10C are views illustrating the concept of the temperature history.
Figure 10B:
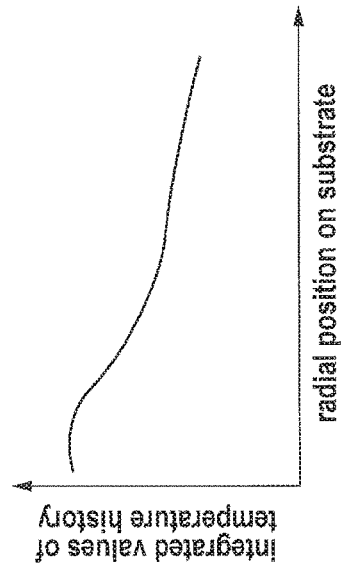
Figure 10C:
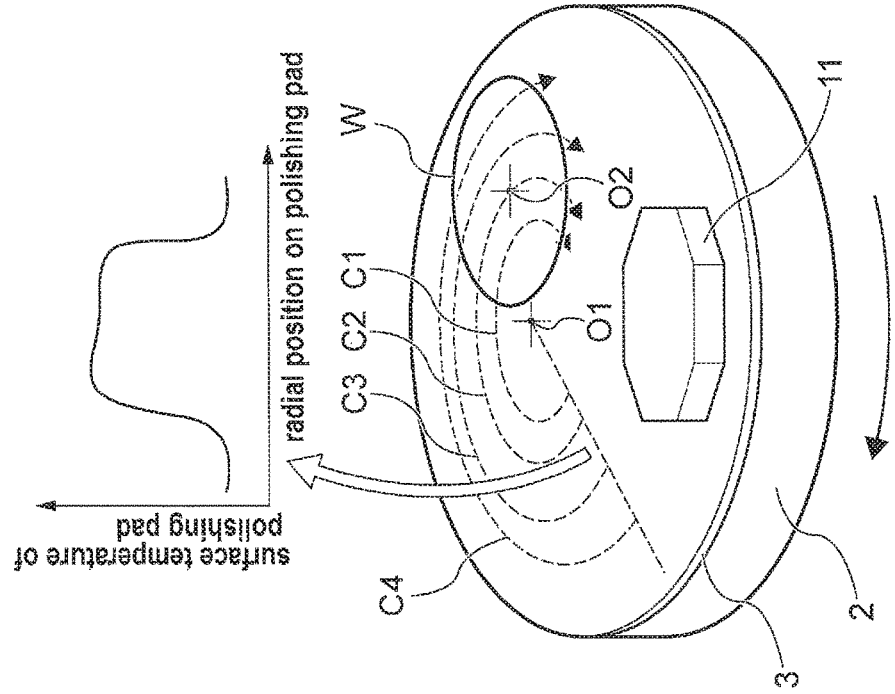

FIGS. 10A, 10B and 10C are views illustrating the concept of the temperature history.

FIG. 10A is a perspective view showing the polishing pad 3, the substrate (wafer) W and the pad contact member 11. As shown in FIG. 10A, the polishing pad 3 rotates about its own center O1, and the substrate W which is brought into sliding contact with the polishing pad 3 rotates about its own center O2. Four concentric circles C1, C2, C3 and C4 are drawn around the center O1 on the polishing pad 3. Because the surface of the polishing pad 3 is being heated by the pad contact member 11, the surface temperature of the polishing pad 3 varies with the radial position on the polishing pad 3 as shown by the upper graph in FIG. 10A. During 360-degree rotation of the substrate W, respective points on the surface, being polished, of the substrate W which is brought in contact with the surface of the polishing pad 3 conic into contact with respective points, having different surface temperatures, located at different radial positions on the polishing pad 3.

The relationship between the rotation angle (0°-360°) of the substrate and the surface temperature of the polishing pad 3 at a point which changes with every moment and which is in contact with a point on the substrate, located on a circle having a radius R and centered at the center O2 of the substrate W, with the radius R being as a variable (R=0-150 mm when the diameter of the substrate is 300 mm) can be defined as temperature history. The temperature history can be expressed in a graph as shown in FIG. 10B in which the horizontal axis represents the rotation angle (0°-360°) of the substrate, and the vertical axis represents the surface temperature of the polishing pad 3 at a point which changes with every moment and which is in contact with the point on the substrate (hereinafter referred to also as "the surface temperature of the polishing pad 3"). Specifically, when the radius R=0, the point on the substrate is always located on the concentric circle C2 on the polishing pad 3 as shown in FIG. 10A, and therefore the surface temperature of the polishing pad 3 does not change even if the rotation angle of the substrate changes. Thus, the relationship between the rotation angle of the substrate and the surface temperature of the polishing pad 3 can be expressed as a straight line parallel to the horizontal axis, as shown in FIG. 10B. As the radius R increases, the line that represents the relationship between the rotation angle of the substrate and the surface temperature of the polishing pad 3 becomes a wave shape having ridges and valleys with an increasing amplitude. In the illustrated example, three lines in the cases of R=0 mm, R=5 mm, and R=150 mm are shown.

As described above, FIG. 10B shows the temperature history, with respect to the rotation angle of the substrate, of a point on the substrate in the cases of R=0 mm, R=5 mm, and R=150 mm. FIG. 10C shows integration data on the temperature history at a radial position R on the substrate which are integrated over the rotational angle range of 0° to 360°. The integrated value in the case of R=0 mm, 5 mm or 150 mm, for example, can be determined by determining the area between each of the lines and the horizontal axis in FIG. 10B. The relationship between the radius R on the substrate (radial position on the substrate) and the integrated value determined in each radius R can be defined as the integrated value of the temperature history during 360-degree rotation of the substrate. This integrated value of the temperature history can be expresses as shown in FIG. 10C. With reference to the exemplary data illustrated in FIG. 10C, the integrated value of the temperature history is the largest at the center of the substrate, and the integrated value decreases toward the outer circumferential side in the radial position on the substrate. Here, although the expression "the integrated value of the temperature history" is used, the expression "the integrated value of the amount of heat" may be used if the temperature history is taken as the amount of heat that the substrate has received from the polishing pad.

Thus, the amount of heat that the substrate receives from the polishing pad is calculated, and from the calculated amount of heat, the integrated value of the amount of heat associated with the rotation of the substrate is calculated for each of different radial positions on the substrate, thereby obtaining a profile of the integrated value of the amount of heat in the radial direction of the substrate. The profile of the integrated value of the amount of heat is prepared and accumulated for each of those areas of the polishing pad whose surface temperatures are adjusted. Then, in comparison with the profile of the integrated value of the amount of heat in the reference case of not using a pad contact member, a profile closest to the reference profile of the integrated value of the amount of heat is selected from the accumulated profiles of the integrated value of the amount of heat. Based on the selected profile of the integrated value of the amount of heat, the area where the surface temperature of the polishing pad is adjusted is determined.

Figure 11A:
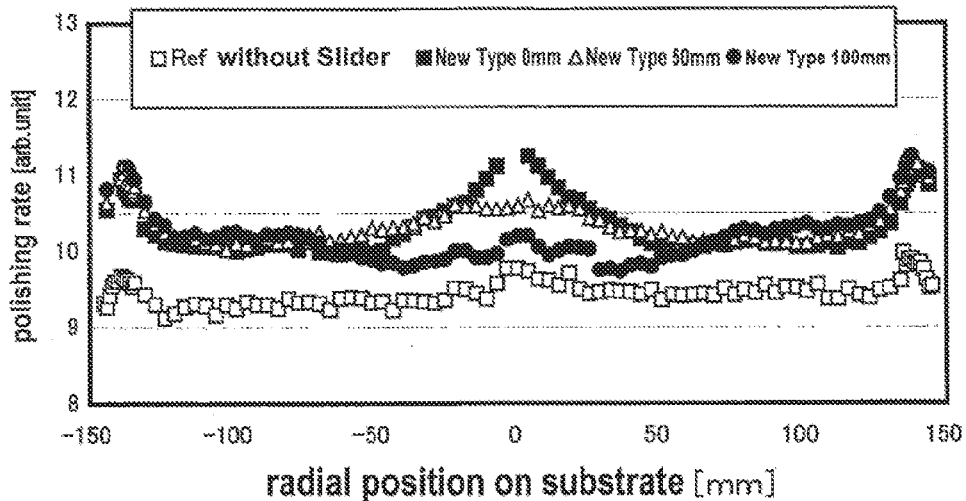
FIG. 11A is a view showing the evaluation results of the polishing rate in the case where the pad contact member of the embodiment shown in FIGS. 6A and 6B is moved radially on the polishing pad.
Figure 11B:
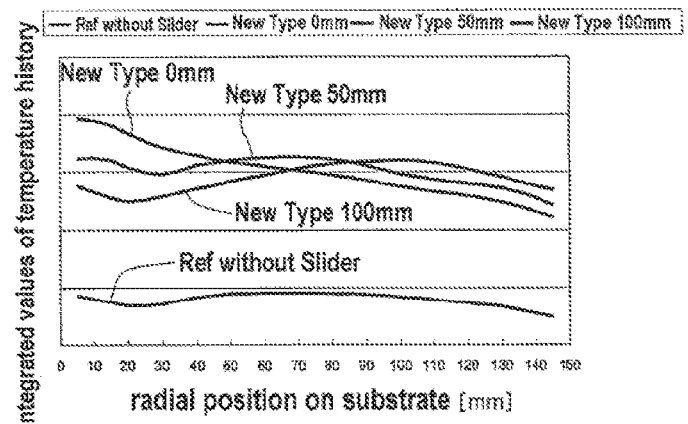
FIG. 11B is a view showing the evaluation results of the integrated values of the temperature history.
Figure 11C:
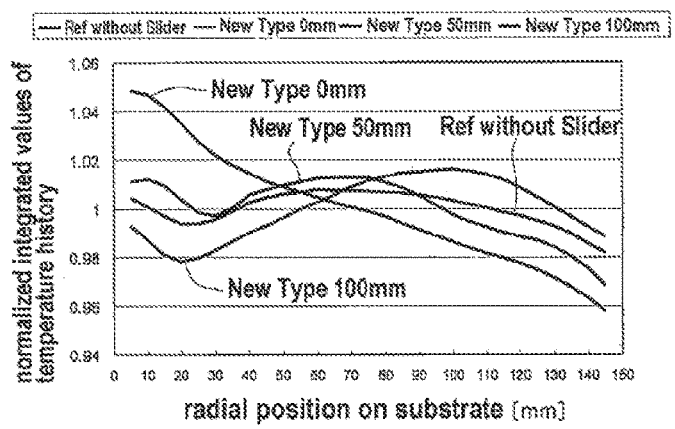
FIG. 11C is a view showing the evaluation results of the normalized integrated values of the temperature history.

FIGS. 11A, 11B and 11C are views showing the evaluation results of the polishing rate (FIG. 11A) in the case where the pad contact member 11 of the embodiment shown in FIGS. 6A and 6B is moved radially on the polishing pad 3, the evaluation results of the integrated values of the temperature history (FIG. 11B) and the evaluation results of the normalized integrated values of the temperature history (FIG. 11C). The integrated value of the temperature history has been evaluated under the same condition in the rotational speed of the top ring 1 and the rotational speed of the polishing table 2 as in the case where the integrated value of the temperature history shown in FIG. 10C has been determined.

In FIGS. 11A, 11B and 11C, "Ref without Slider", "New Type 0 mm", "New Type 50 mm" and "New Type 100 mm" have been described above with reference to FIG. 9. Further, FIG. 11A is the same graph as FIG. 8A.

As is clear from FIG. 11A, in the central area of the substrate, there is a considerable variation in the polishing rate between the cases of "New Type 0 mm", "New Type 50 mm" and "New Type 100 mm". It is therefore conceivable that the polishing profile of the substrate and the temperature of the substrate have a correlation. The distribution of the polishing rate in the case of "New Type 50 mm" is closest to that in the case of "Ref without Slider", and the polishing profile becomes flatter in the case of "New Type 50 mm". On the other hand, the polishing rate in the central area of the substrate is the highest in the case of "New Type 0 mm".

FIG. 11B shows the integrated value of the temperature history at a radial position on the substrate. As can be seen in FIG. 11B, the integrated value of the temperature history is large in the case of "New Type 0 mm" in an area around the center of the substrate, and large in the case of "New Type 50 mm" in an area with the radius R ranging from about 50 mm to 80 mm, and then large in the case of "New Type 100 mm" in an area with the radius R of not less than about 80 mm. FIG. 11C shows data obtained by normalizing the data of FIG. 11B.

As is clear from the normalized data in FIG. 11C, it is understood that the profile in the case of using "New Type 50 mm" is closest to the profile in the case of "Ref without Slider". From the viewpoint of increasing the polishing rate, it is preferred to employ "New Type 0 mm" which makes the temperature of the central portion of the substrate higher. Thus, it is considered that the temperature of the radially outer area of the substrate should be further increased while keeping the installation position of the pad contact member at "New Type 0 mm".

Figure 12A:
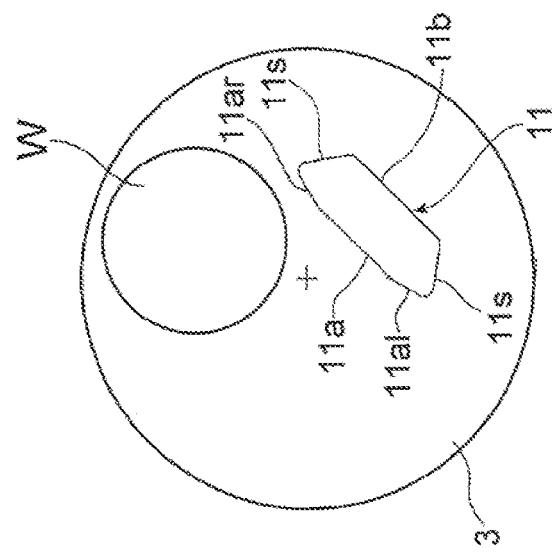
FIGS. 12A and 12B are comparative views showing the pad contact member shown in FIGS. 6A and 6B according to the embodiment and the pad contact member according to another embodiment.
Figure 12B:
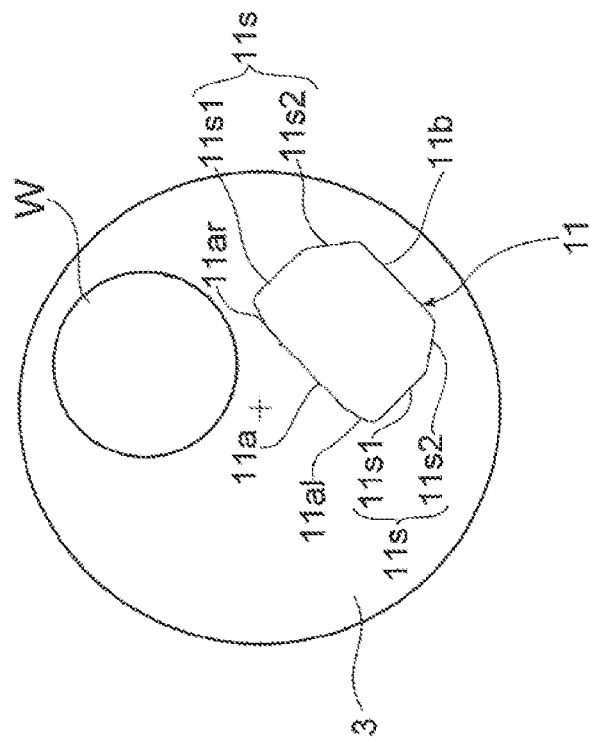

FIGS. 12A and 12B are comparative views showing the pad contact member 11 shown in FIGS. 6A and 6B according to the above-described embodiment and a pad contact member 11 according to another embodiment. FIG. 12A is a plan view showing the pad contact member 11 shown in FIGS. 6A and 6B, the polishing pad 3 and the substrate (wafer) W to be polished, and FIG. 12B is a plan view showing the pad contact member 11 according to another embodiment, the polishing pad 3 and the substrate (wafer) W to be polished.

While the pad contact member 11 shown in FIG. 12A has a planar shape of a generally trapezoidal shape, the pad contact member 11 shown in FIG. 12B has a planar shape of a generally hexagonal shape. Specifically, the pad contact member 11 shown in FIG. 12B has an upper side 11a, a lower side 11b, and right and left sides 11s, 11s. The right and left sides 11s, 11s have first sides 11s1, 11s1 extending approximately orthogonally to the upper side 11a from their ends toward the outer circumferential side of the polishing pad 3, and second sides 11s2, 11s2 which are bent inward from the ends of the first sides 11s1, 11s1. Therefore, the pad contact member 11 has a planar shape of a generally hexagonal shape. Further, as with the pad contact member 11 shown in FIG. 11A, both end portions of the upper surface 11a of the pad contact member 11 are inclined with respect to the central portion and form inclined sides 11al, 11ar. Thus, the planar shape of the pad contact member 11 should be called a deformed octagonal shape.

As is clear from FIGS. 12A and 12B, the pad contact member 11 shown in FIG. 12B has such a shape that a rectangular portion, surrounded by the first sides 11s1, 11s1 and two lines connecting the corresponding ends of the first sides 11s1, 11s1, is added to the pad contact member 11 shown in FIG. 12A. Specifically, the pad contact member 11 shown in FIG. 12B has an increased heating area so that an outer circumferential portion of the polishing pad 3 can also be heated.

Figure 13A:
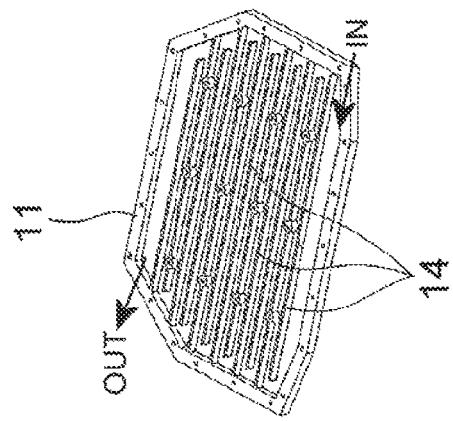
FIGS. 13A, 13B and 13C are perspective views each showing the construction of a flow passage formed in the pad contact member shown in FIG. 12B.
Figure 13B:
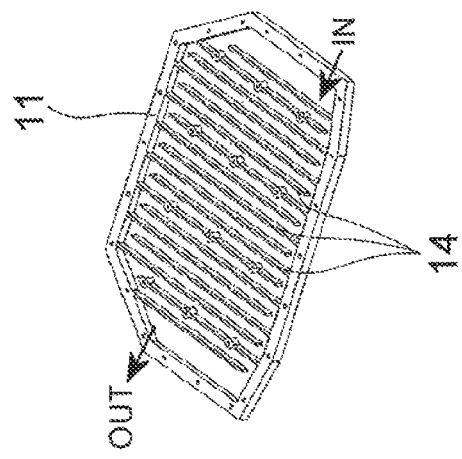
Figure 13C:
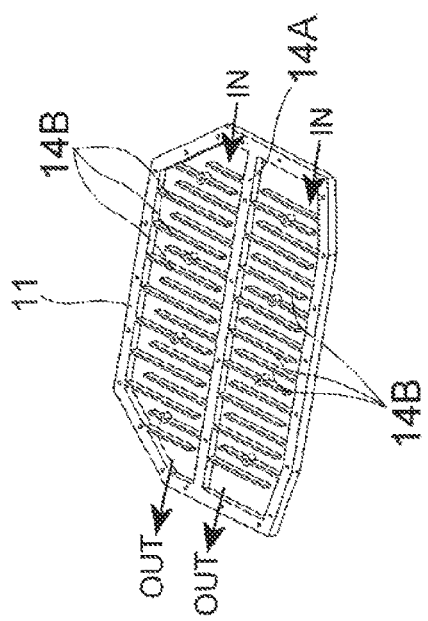

FIGS. 13A, 13B and 13C are perspective views each showing the construction of a flow passage formed in the pad contact member 11 shown in FIG. 12B.

In the pad contact member 11 shown in FIG. 13A, a plurality of partitions 14 provided therein extend laterally, and one ends of the partitions 14 are connected to an outer frame. These partitions 14 form a single multi-folded zigzag flow passage. The liquid flows into the pad contact member 11 from an inflow port (IN), and flows through the zigzag flow passage and flows out from a discharge port (OUT).

In the pad contact member 11 shown in FIG. 13B, a plurality of partitions 14 provided therein extend vertically, and one ends of the partitions 14 are connected to an outer frame. These partitions 14 form a single multi-folded zigzag flow passage. The liquid flows into the pad contact member 11 from an inflow port (IN), and flows through the zigzag flow passage and flows out from a discharge port (OUT).

In the pad contact member 11 shown in FIG. 13C, a laterally-extending first partition 14A is provided in the interior, and the both ends of the first partition 14A are connected to an outer frame. Thus, the interior of the pad contact member 11 is divided by the first partition 14A into two upper and lower spaces (areas). A plurality of vertically-extending second partitions 149 are provided in each of the upper and lower spaces. Each of the second partitions 14B, at its one end, is connected to the outer frame or to the first partition 14A. Therefore, a single multi-folded zigzag flow passage is formed by the plural partitions 14B in each of the upper and lower spaces. The liquid flows into the pad contact member 11 from two inflow ports (IN) formed in the upper and lower spaces, and flows through the two parallel zigzag flow passages and flows out from two discharge ports (OUT).

Figure 14A:
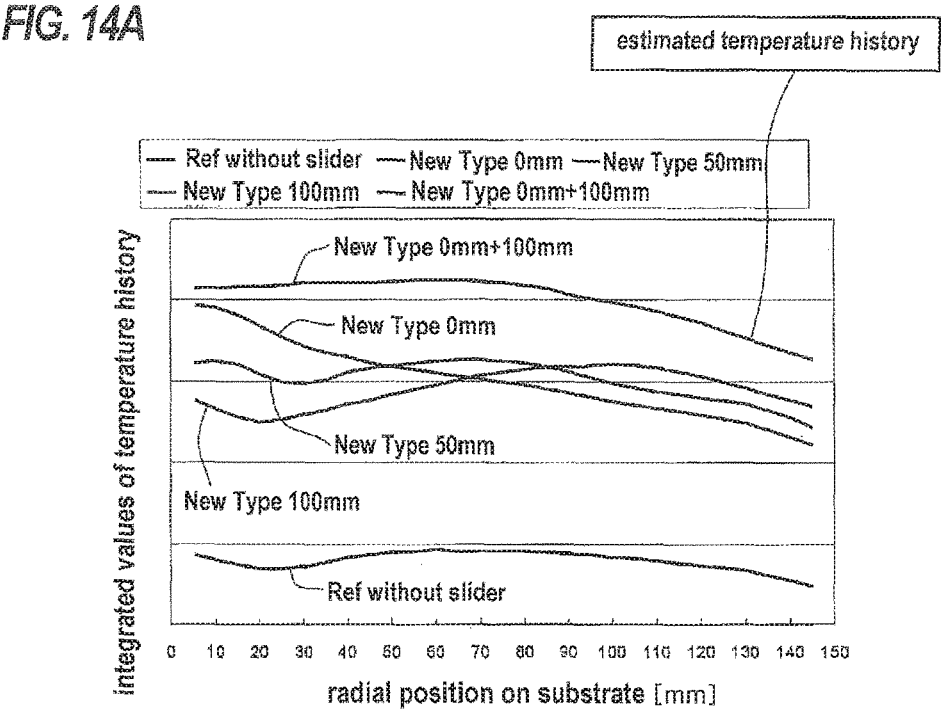
FIG. 14A is a view showing the case where the evaluation results of the integrated value of the temperature history in the case of using the pad contact member according to another embodiment shown in FIG. 12B is added to the evaluation results of the integrated value of the temperature history shown in FIG. 11B.

FIG. 14A is a view showing the case where the evaluation results of the integrated value of the temperature history in the case of using the pad contact member 11 according to another embodiment shown in FIG. 12B is added to the evaluation results of the integrated value of the temperature history shown in FIG. 11B. In FIG. 14A, the data of "New Type 0 mm+100 mm" correspond to the estimated integrated value of the temperature history which can be expected to be obtained by using the pad contact member 11 shown in FIG. 12B. Since the pad contact member 11 shown in FIG. 12B can be thought to be approximated by the combination of the "New Type 0 mm" and the "New Type 100 mm" shown in FIG. 9, the data of "New Type 0 mm+100 mm" are shown as the estimated temperature history in FIG. 14A.

Figure 14B:
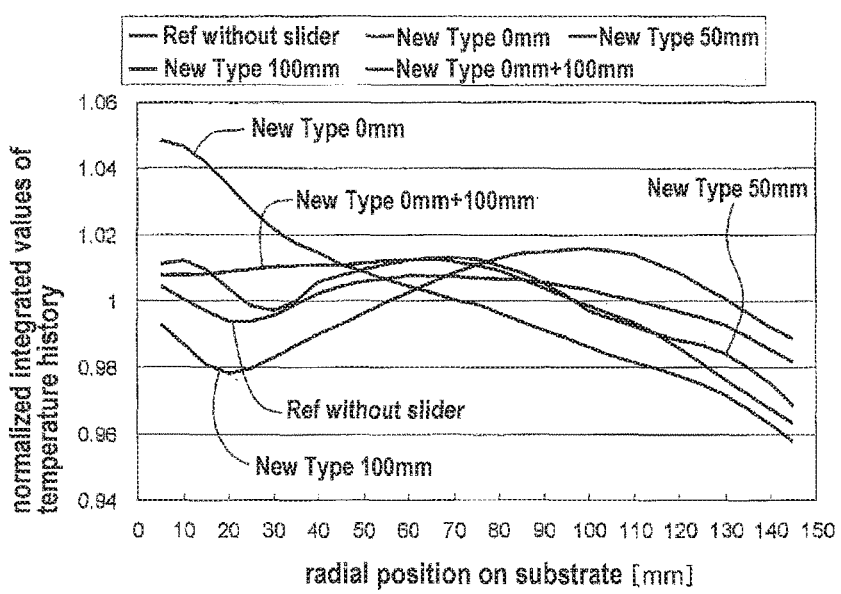
FIG. 14B is a view showing the evaluation results of the normalized integrated value of the temperature history.

FIG. 14B shows data obtained by normalizing the data of FIG. 14A. As is clear from the normalized data shown in FIG. 14B, it is understood that, as with the case of "New Type 50 mm", the profile of the normalized integrated value of the temperature history in the case of using "New Type 0 mm+100 mm" can be approximated by the profile of the normalized integrated value of the temperature history in the case of "Ref without Slider".

The evaluation results of temperature in the case where the surface of the polishing pad 3 is heated by using the pad contact member 11 according to another embodiment shown in FIGS. 13A, 13B and 13C and by changing the flow rate of the liquid (heated water) supplied to the pad contact members 11 will be described with reference to FIGS. 15A, 15B and 15C.

The pad contact member 11 is placed on the polishing pad 3 such that the midpoint of the lower side 11b of the pad contact member 11 accords with a circle (radius: 290 mm) on the polishing pad.

Figure 15A:
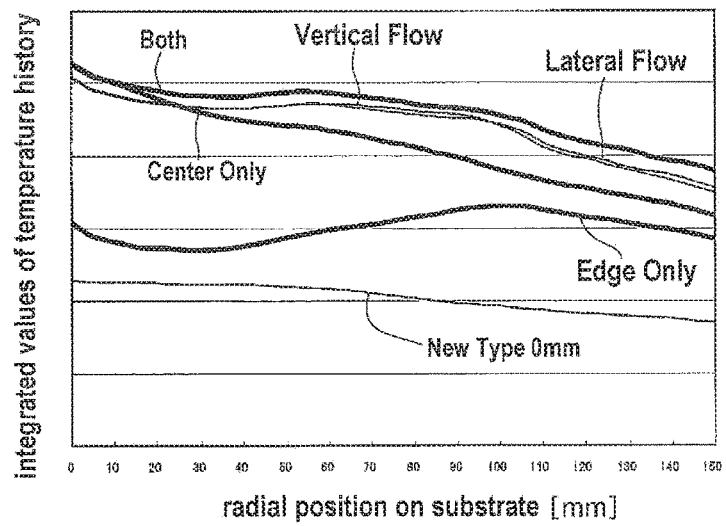
FIGS. 15A, 15B and 15C are views showing the evaluation results of temperature in the case where the surface of the polishing pad is heated by using the pad contact member according to another embodiment shown in FIGS. 13A, 13B and 13C and by changing the flow rate of the liquid (heated water) supplied to the pad contact members.

FIG. 15A shows the relationship between a radial position on the substrate and the integrated value of the temperature history experienced by the substance surface in the case of using the various pad contact members.

Of the pad contact members 11 according to other embodiments, the case of using the pad contact member shown in FIG. 13A is herein referred to as "Lateral Flow", the case of using the pad contact member shown in FIG. 13B is herein referred to as "Vertical Flow", and the case of using the pad contact member shown in FIG. 13C is divided into three types and herein referred to as "Center Only", "Edge Only" or "Both". "Center Only" indicates the case where heated water is allowed to flow only in the flow passage formed in the space, located on the center side of the polishing pad, of the two spaces divided by the first partition 14A. "Edge Only" indicates the case where heated water is allowed to flow only in the flow passage formed in the space, located on the outer circumferential side of the polishing pad, of the two spaces divided by the first partition 14A. "Both" indicates the case where heated water is allowed to flow in both of the two spaces divided by the first partition 14A. Further, "New Type 0 mm" is shown, and "New Type 0 mm" indicates the case where the pad contact member having the shape described in FIGS. 6A, 6B and 6C is placed at the locations described in FIGS. 8A through 8E. In either case, heated water is supplied to the pad contact member at a flow rate of 5.0 liters/min.

As is clear from FIG. 15A, the integrated value of the pad temperature history can be controlled by changing the area, to which heated water is supplied, of the pad contact member. Further, it is considered that the integrated value of the temperature history can be finely controlled by changing the flow rate of heated water supplied to the pad contact member. The data shown in FIG. 15A correspond to data in the case where polishing of the substrate was not performed. However, it is conceivable that also in the case of performing polishing of the substrate, the integrated value of the temperature history can be controlled by changing the area, to which heated water is supplied, of the pad contact member, and thus the polishing profile can be controlled.

Figure 15B:
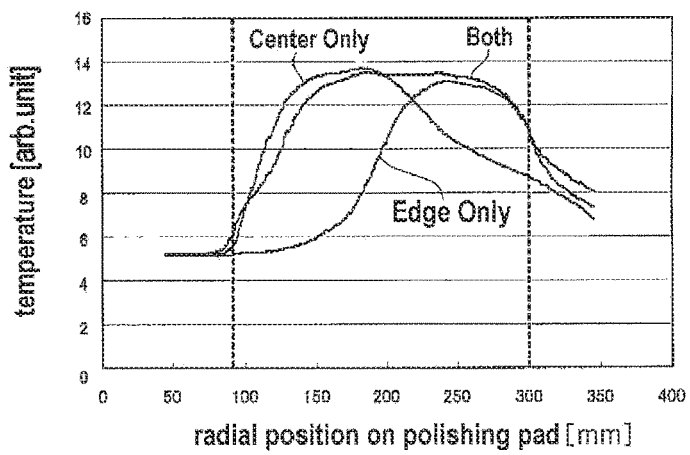

FIG. 15B shows the temperature of the polishing pad at a radial position on the polishing pad in the cases of "Both", "Center Only" and "Edge Only". As is clear from FIG. 15B, in the case of "Edge Only", the temperature of the polishing pad starts to increase from the radial position on the polishing pad of about 150 mm or thereabout, and becomes the maximum at the radial position of about 250 mm or thereabout. In the case of "Center Only", the temperature of the polishing pad starts to increase when the radial position on the polishing pad reaches about 80 mm, and becomes the maximum from about 150 mm or thereabout, and then decreases when the radial position on the polishing pad reaches about 200 mm. In the case of "Both", the profile is represented by a curved line having a combination of the features of the profiles in the cases of "Center Only" and "Edge Only", and thus steady high temperature state of the polishing pad continues over a wide range of radial position on the polishing pad.

Figure 15C:
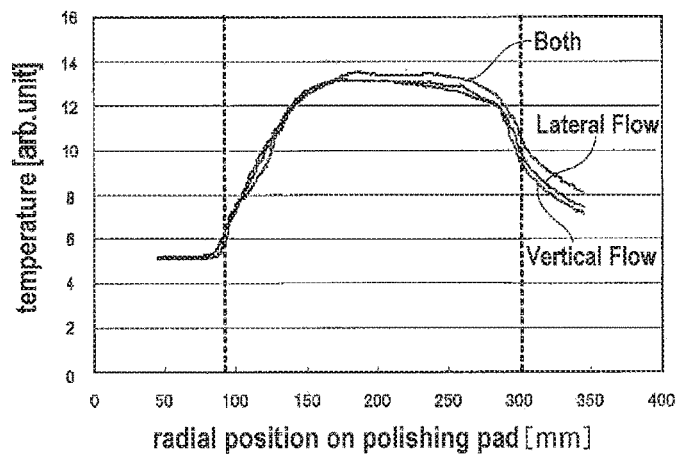

FIG. 15C shows the temperature of the polishing pad at a radial position on the polishing pad in the cases of "Both", "Lateral Flow" and "Vertical Flow". As is clear from FIG. 15C, in all the cases, the temperatures of the polishing pad show temperature change curves similar to each other. However, the temperature of the polishing pad is slightly higher in the case of "Both" than in the cases of "Lateral Flow" and "Vertical Flow" in a radial position range of not less than 170 mm. Although heated water is supplied into the entire interior space of the pad contact member in the cases of "Lateral Flow" and "Vertical Flow", the temperature of the polishing pad can be adjusted by changing the installation location of the pad contact member on the polishing pad.

The data shown in FIGS. 15A, 15B and 15C were obtained by supplying heated water to the pad contact members at a flow rate of 5 liters/min. The temperature of the polishing pad can be adjusted by supplying heated water into the two spaces, divided by the first partition 14A, at different flow rates. Further, the temperature of the polishing pad can be adjusted by changing the temperature of the flowing liquid.

In the above-described embodiments, the temperature distribution in the radial direction of polishing pad is made close to that in the case of not using a pad contact member by using the pad contact member 11 having a deformed hexagonal shape (FIGS. 6A and 6B) or the pad contact member 11 having a deformed octagonal shape (FIGS. 13A, 13B and 13C), or by changing the flow passage for liquid (heated water). However, an ideal temperature distribution in the radial direction of the polishing pad varies depending on the polishing process. Therefore, it is desirable that the pad contact member 11 shown in FIGS. 6A and 6B and the pad contact member 11 shown in FIGS. 13A, 13B and 13C are movable in the radial direction of the polishing pad so as to control the temperature distribution in the radial direction of the polishing pad.

Figure 16:
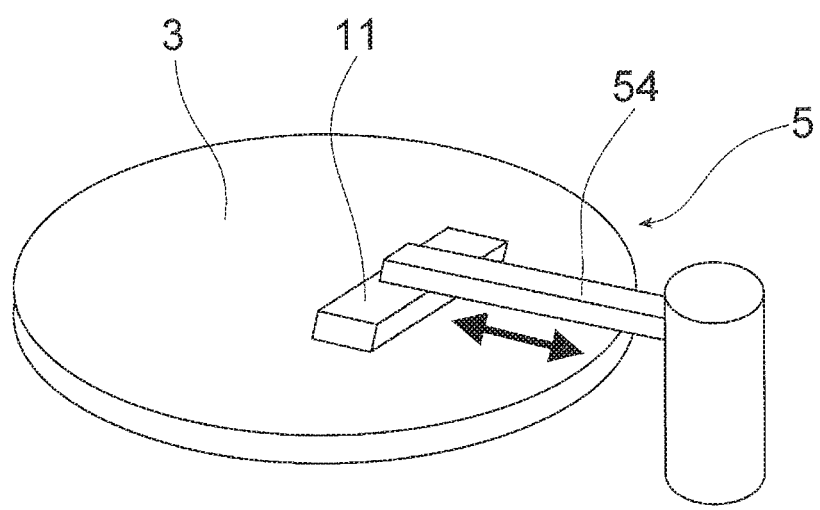
FIG. 16 is a perspective view showing a pad temperature adjustment mechanism which has a mechanism for moving the pad contact member in the radial direction of the polishing pad.

FIG. 16 is a perspective view showing a pad temperature adjustment mechanism 5 which has a mechanism for moving the pad contact member 11 in the radial direction of the polishing pad. As shown in FIG. 16, an arm 54 for supporting the pad contact member 11 can be reciprocated manually in the radial direction of the polishing pad 3 as shown by the arrow. Thus, an area in the radial direction of the polishing pad 3 to be heated by the pad contact member 11 can be appropriately selected, thereby controlling the temperature distribution in the radial direction of the polishing pad 3.

Figure 17:
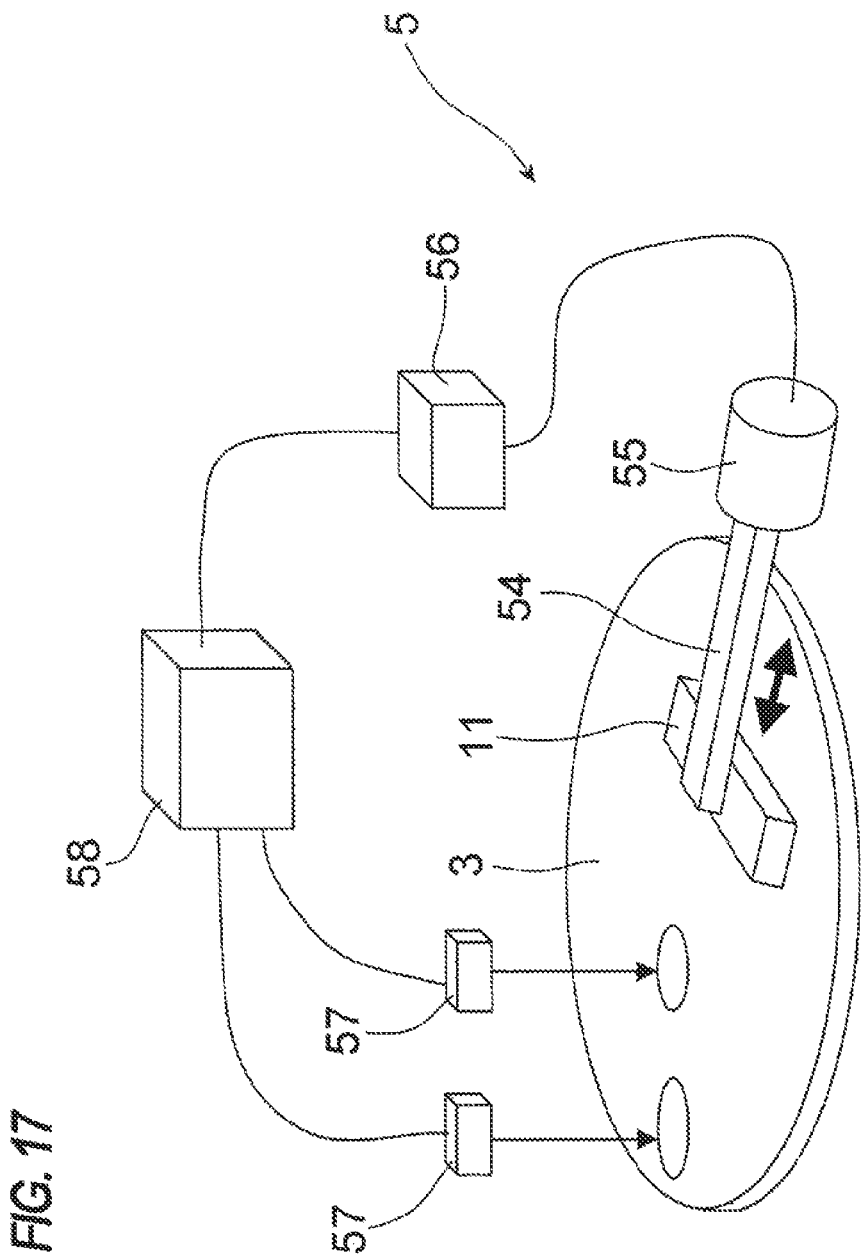
FIG. 17 is a perspective view showing a pad temperature adjustment mechanism which has an automated mechanism for reciprocating the pad contact member in the radial direction of the polishing pad.

FIG. 17 is a perspective view showing a pad temperature adjustment mechanism 5 which has an automated mechanism for reciprocating the pad contact member 11 in the radial direction of the polishing pad. As shown in FIG. 17, an arm 54 for supporting the pad contact member 11 can be reciprocated in the radial direction of the polishing pad 3 by a motor 55. The motor 55 is controlled by a motor controller 56. A plurality of thermographs or radiation thermometers 57 are disposed above the polishing pad 3 so that the distribution of the surface temperature of the polishing pad 3 can be measured. The motor controller 56 and the radiation thermometers 57 are connected to a main controller 58. With the configuration shown in FIG. 17, by inputting the measurement result of the radiation thermometers 57 into the main controller 58 and controlling the motor controller 56 by the main controller 58, the measurement result of the surface temperature distribution in the polishing pad 3 is fed back, so that the pad contact member 11 can be moved so as to obtain a desired temperature distribution in the radial direction of the polishing pad 3.

Figure 18:
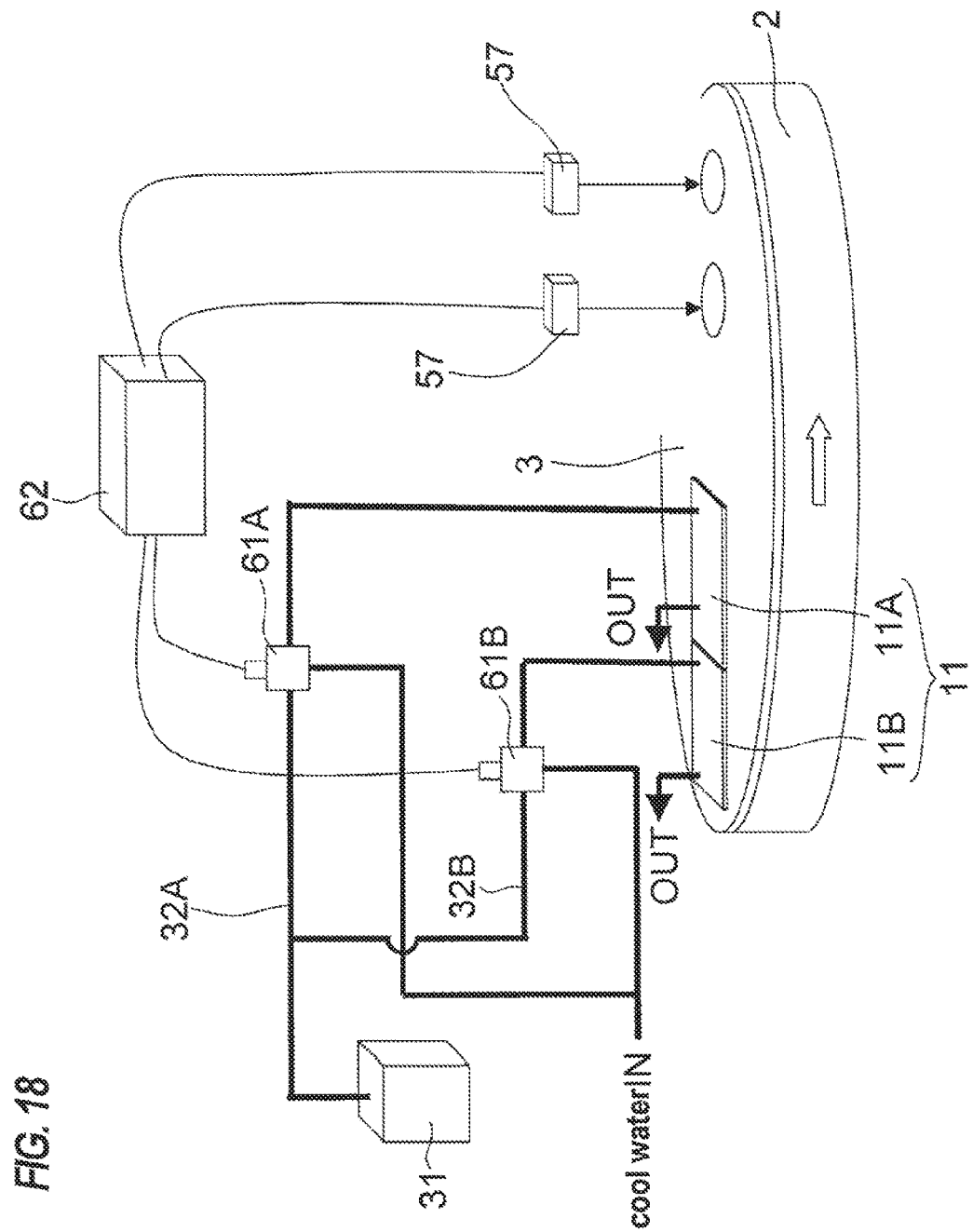
FIG. 18 is a view showing an embodiment in which the pad contact member is divided into a plurality of regions, i.e., an inner region and an outer region in the radial direction of the polishing pad, and a liquid (heated water can be supplied individually to each of the inner and outer regions so as to control the temperature in the radial direction of the polishing pad for each of the corresponding inner and outer areas.

FIG. 18 is a view showing an embodiment in which the pad contact member 11 is divided into a plurality of regions, i.e., an inner region and an outer region in the radial direction of the polishing pad 3, and a liquid (heated water) can be supplied individually to each of the inner and outer regions so as to control the temperature in the radial direction of the polishing pad 3 for each of the corresponding inner and outer areas. The pad contact member 11 shown in FIG. 18 may have the same construction as that shown in FIGS. 13A, 13B and 13C. As shown in FIG. 18, the pad contact member 11 comprises a pad contact portion 11A located at an inner position in the radial direction of the polishing pad 3, and a pad contact portion 11B located at an outer position in the radial direction of the polishing pad 3. A liquid (heated water) can be supplied individually to each of the pad contact portions 11A, 11B. Specifically, the liquid (heated water) can be supplied from a liquid supply tank 31 through supply lines 32A, 32B to the pad contact portions 11A, 11B, respectively. Proportional control valves 61A, 61B are installed in the supply lines 32A, 32B, respectively, so that the flow rate of the liquid (heated water) to be supplied to each of the pad contact portions 11A, 11B can be controlled individually by the proportional control valves 61A, 61B. A plurality of thermographs or radiation thermometers 57 are disposed above the polishing pad 3 so that the distribution of the surface temperature of the polishing pad 3 can be measured. The radiation thermometers 57 and the proportional control valves 61A, 61B are connected to a temperature controller 62. With the configuration shown in FIG. 18, the liquid (heated water) can be supplied individually at a controlled flow rate to each of the pad contact portions 11A, 11B located at an inner position and at an outer position of the polishing pad 3, and thus the temperature in the radial direction of the polishing pad 3 can be controlled for each of the corresponding inner and outer areas. In FIG. 18, the pad contact member 11 is divided into the two inner and outer regions in the radial direction of the polishing pad 3. However, the pad contact member 11 may be divided into three or more regions. As shown in FIG. 18, cold water can also be supplied to the supply lines 32A, 32B. Although the proportional control valves 61A, 61B for changing the mixing ratio between heated water and cold water is shown in FIG. 18, it is possible to employ a switching system configured to switch between heated water and cold water by means of switching valves and adjust the flow rate by means of a flow rate regulating valve as shown in FIG. 2.

Figure 19:
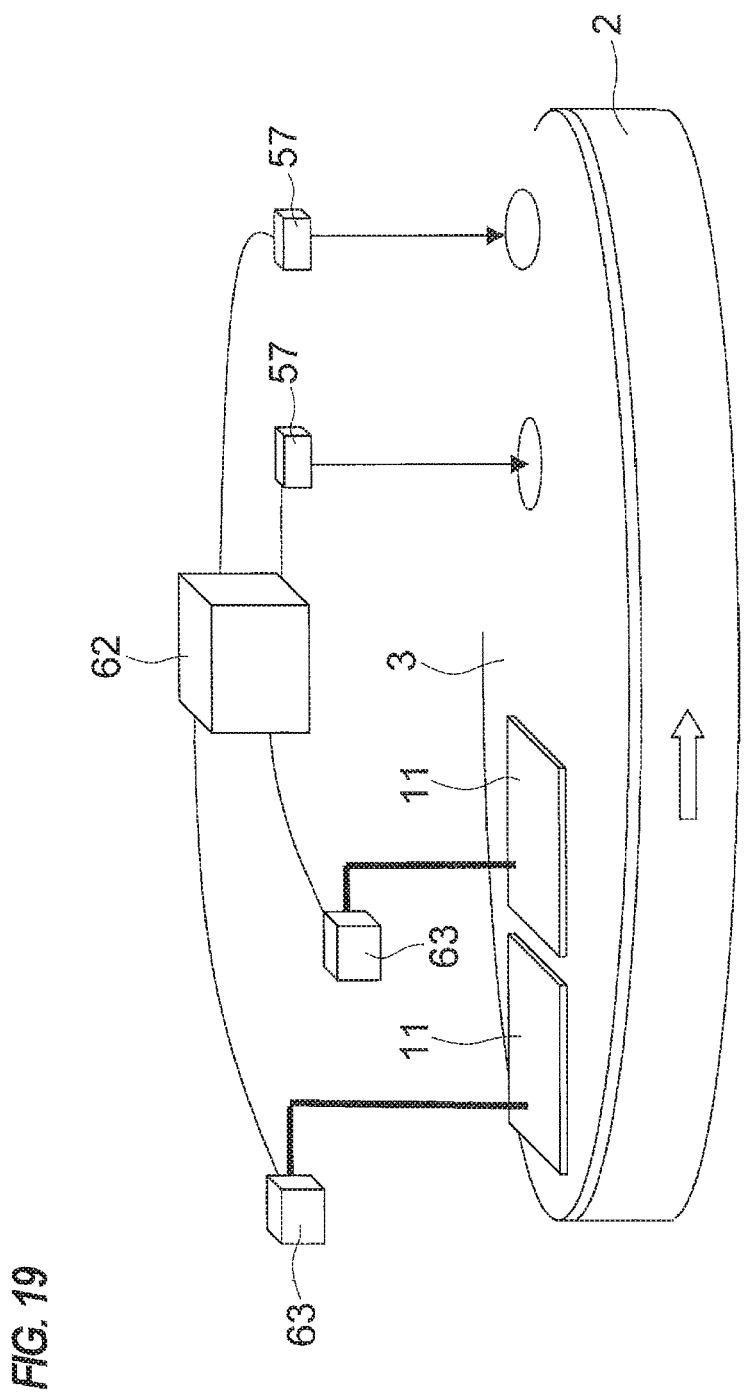
FIG. 19 is a view showing an embodiment in which a plurality of pad contact members, each comprised of a ceramic heater having a built-in heater, are arranged in the radial direction of the polishing pad so as to control the temperature in the radial direction of the polishing pad for each of the corresponding annular areas.

FIG. 19 is a view showing an embodiment hr which a plurality of pad contact members 11, each comprised of a ceramic heater having a built-in heater, are arranged in the radial direction of the polishing pad 3 so as to control the temperature in the radial direction of the polishing pad 3 for each of the corresponding annular areas. As shown in FIG. 19, the plural pad contact members 11 comprising a ceramic heater are arranged side by side in the radial direction of the polishing pad 3. Electric power is supplied from a power-supply device 63 to each of the pad contact members 11. A plurality of thermographs or radiation thermometers 57 are disposed above the polishing pad 3 so that the distribution of the surface temperature of the polishing pad 3 can be measured. The radiation thermometers 57 and the power source devices 63, 63 are connected to a temperature controller 62. With the configuration shown in FIG. 19, by inputting the measurement results of the radiation thermometers 57 into the temperature controller 62 and controlling the power-supply devices 63, 63 by the temperature controller 62, the measurement result of the surface temperature distribution in the polishing pad 3 is fed back, so that the pad contact members 11, 11, each comprised of a ceramic heater, can be controlled so as to obtain a desired temperature distribution in the radial direction of the polishing pad 3.

The pad temperature adjustment mechanism 5 of the embodiment is configured to be capable of switchably supplying heated water and cold water to the pad contact member 11, and thus the pad temperature adjustment mechanism 5 is capable of not only heating but also cooling the surface of the polishing pad 3.

FIG. 20A is a diagram showing a liquid supply system for selectively supplying heated water and cold water to the pad contact member 11. FIG. 20A is a diagram showing the liquid supply system of FIG. 2 in a simplified manner. As shown in FIG. 20A, a valve V1 is installed in the supply line 32 so that heated water can be supplied to the pad contact member 11 via the valve V1. The heated water flowing in the supply line 32 can be returned to the liquid supply tank 31 (see FIG. 2) via a valve V2 and thus can be circulated. A valve V3 is installed in the cold water line 41 so that cold water can be supplied to the pad contact member 11 via the valve V3. A valve V4 is installed in the return line 33 so that the heated water that has been supplied to the pad contact member 11 can be returned to the liquid supply tank 31 (see FIG. 2) via the valve V4. The cold water flowing in the return line 33 can be discharged via a valve V5. As described above, the valve V1 is a heated water supply valve, the valve V2 is a heated water circulation valve, the valve V3 is a cold water supply valve, the valve V4 is a heated water return valve, and the valve V5 is a water discharge valve.

FIG. 20B is a diagram showing the states of the respective valves when performing switching from the supply of heated water to the supply of cold water and switching from the supply of cold water to the supply of heated water. As shown in FIG. 20B, when the liquid to be supplied to the pad contact member 11 is switched from hearted water to cold water, the valves are switched in the following manner: The valve V1 is switched from "Open" to "Close"; the valve V2 is switched from "Close" to "Open" with a delay; the valve V3 is switched from "Close" to "Open"; the valve V4 is switched from "Open" to "Close" with a delay; and the valve V5 is switched from "Close" to "Open" with a delay. When the liquid to be supplied to the pad contact member 11 is switched from cold water to heated water, the valves are switched in the following manner: The valve V1 is switched from "Close" to "Open"; the valve V2 is switched from "Open" to "Close"; the valve V3 is switched from "Open" to "Close"; the valve V4 is switched from "Close" to "Open" with a delay; and the valve V5 is switched from "Open" to "Close" with a delay. In this manner, the valves V1 to V5 are switched optionally with an appropriate delay. When switching from the supply of heated water to the supply of cold water, the heated water remaining in the pad contact member 11 and the piping is returned to the temperature regulator. When switching from the supply of cold water to the supply of heated water, cold water remaining in the pad contact member 11 and the piping is discharged to prevent a lowering of temperature of the heated water in the temperature regulator.

A method for controlling switching between the supply of heated water and the supply of cold water in order to control the surface temperature of the polishing pad 3 at a preset temperature will now be described with reference to FIGS. 21A and 21B.

FIG. 21A is a view showing a change in the surface temperature of the polishing pad 3. The horizontal axis represents time and the vertical axis represents the surface temperature of the polishing pad 3. Preset temperatures Ts1 and Ts2 for the surface of the polishing pad 3 are shown on the vertical axis.

As shown in FIG. 21A, the supply of heated water is started when the current temperature of the polishing pad 3 is lower than the preset temperature Ts2, i.e., when preset temperature>current temperature (start of step 1). Then, the supply of cold water is started when the current temperature of the polishing pad 3 becomes higher than the preset temperature Ts1, i.e., when preset temperature<current temperature (start of step 2).

FIG. 21B is an enlarged view of the portion A of FIG. 21A. As shown in FIG. 21B, an upper control limit and a lower control limit are set on the preset temperature Ts1. When the current temperature of the polishing pad 3 reaches the upper or lower control limit of the preset temperature Ts1, a valve switching signal is sent out. The CMP controller 50 (see FIG. 2) switches the valves for heated water or cold water based on the state of the valve switching signal. The switching of the valves is performed in the manner described above with reference to FIGS. 20A and 20B.

Although the embodiments of the present invention have been described herein, the present invention is not intended to be limited to these embodiments. Therefore, it should be noted that the present invention may be applied to other various embodiments within a scope of the technical concept of the present invention.

What is claimed is:

1. A polishing apparatus for polishing a substrate by pressing the substrate against a polishing pad on a polishing table, comprising:
   a top ring configured to press the substrate against the polishing pad on the polishing table;
   a pad contact member configured to be brought in contact with the surface of the polishing pad to heat or cool the polishing pad; and
   a liquid supply system comprising a liquid supply tank having a heater therein, a heated water supply line having a first valve configured to supply heated water from the liquid supply tank to the pad contact member, a return line having a second valve configured to return the heated water from the pad contact member to the liquid supply tank, a cold water supply line having a third valve configured to supply cold water to the pad contact member, and a discharge line having a fourth valve configured to discharge the heated water or the cold water from the pad contact member to the outside of the liquid supply system;
   wherein when the liquid to be supplied to the pad contact member is switched between the heated water and the cold water, the valve switching is performed with an appropriate delay so that the cold water is supplied to the pad contact member after returning the heated water, remaining in the pad contact member and piping, to the liquid supply system or the heated water is supplied to the pad contact member after discharging the cold water remaining in the pad contact member and piping.

2. The polishing apparatus according to claim 1, wherein a partition is provided in an interior of the pad contact member to form a plurality of passages which have an inlet and an outlet, respectively and are configured to allow the heated water or the cold water to flow individually.

3. The polishing apparatus according to claim 1, further comprising:
   a thermometer configured to measure a surface temperature of the polishing pad; and
   a temperature controller configured to control the surface temperature of the polishing pad based on a measured surface temperature measured by the thermometer;
   wherein the temperature controller controls switching of the first to fourth valves to start supply of the heated water or the cold water to the pad contact member, based on a comparison result between a preset temperature of the polishing pad and the measured surface temperature measured by the thermometer.

4. The polishing apparatus according to claim 3, wherein an upper control limit and a lower control limit are set on the preset temperature; and
   the temperature controller controls switching of the first to fourth valves to start supply of the heated water or the cold water to the pad contact member when the measured surface temperature reaches the upper control limit or the lower control limit.

5. The polishing apparatus according to claim 1, further comprising:
   a circulating line having a fifth valve configured to circulate the heated water such that the heated water flows out from the liquid supply tank, flows through the circulating line, and flows into the liquid supply tank.

* * * * *